(12) United States Patent
Mondlock et al.

(10) Patent No.: US 12,412,077 B2
(45) Date of Patent: Sep. 9, 2025

(54) SYSTEMS AND METHODS FOR MANAGING DECENTRALIZED DATA SOURCES IN GENERATIVE ARTIFICIAL INTELLIGENCE PIPELINES

(71) Applicant: MCKINSEY & COMPANY, INC., New York, NY (US)

(72) Inventors: Peter Mondlock, Highland Park, IL (US); William M.P. Hudelson, London (GB); Kitti Lakner, New York, NY (US)

(73) Assignee: MCKINSEY & COMPANY, INC., New York, NY (US)

( * ) Notice: Subject to any disclaimer, the term of this patent is extended or adjusted under 35 U.S.C. 154(b) by 0 days.

(21) Appl. No.: 18/493,741

(22) Filed: Oct. 24, 2023

(65) Prior Publication Data

US 2025/0131247 A1    Apr. 24, 2025

(51) Int. Cl.
*G06N 3/0455* (2023.01)
*G06F 16/2458* (2019.01)
*G06F 16/28* (2019.01)
*G06N 3/0475* (2023.01)

(52) U.S. Cl.
CPC ....... *G06N 3/0455* (2023.01); *G06F 16/2471* (2019.01); *G06F 16/284* (2019.01); *G06N 3/0475* (2023.01)

(58) Field of Classification Search
CPC .............. G06N 3/0455; G06N 3/0475; G06F 16/2471; G06F 16/284
See application file for complete search history.

(56) References Cited

U.S. PATENT DOCUMENTS

| | | | |
|---|---|---|---|
| 12,265,528 B1* | 4/2025 | Lan | G06F 16/243 |
| 2013/0262501 A1* | 10/2013 | Kuchmann-Beauger | G06F 16/24535 707/769 |
| 2018/0174020 A1* | 6/2018 | Wu | G06N 3/044 |
| 2021/0192134 A1* | 6/2021 | Yue | G06F 16/3326 |
| 2021/0271872 A1* | 9/2021 | Gupta | G06V 30/153 |

(Continued)

OTHER PUBLICATIONS

Shu, Yubo, et al. "An Intent-based and Annotation-free Method for Duplicate Question Detection in CQA Forums." Findings of the Association for Computational Linguistics: EMNLP 2023. 2023. (Year: 2023).*

(Continued)

*Primary Examiner* — Miranda M Huang
*Assistant Examiner* — Sidney Vincent Bostwick
(74) *Attorney, Agent, or Firm* — MARSHALL, GERSTEIN & BORUN LLP; Randall G. Rueth

(57) ABSTRACT

The systems and methods described herein relate to improvements to generative artificial intelligence systems through the use of generative artificial intelligence pipelines to supply external information to pre-trained large language models for use in answering queries. To improve the efficiency and accuracy of large language models in responding to user queries, according to various aspects described herein, such queries may be modified and augmented with additional relevant information from decentralized data sources. The retrieval-augmented generation pipeline may interface with one or more decentralized data sources and retrieve the external information, including unstructured text and/or structured data.

11 Claims, 17 Drawing Sheets

(56) References Cited

U.S. PATENT DOCUMENTS

2023/0252233 A1* 8/2023 Gutierrez ............... G06F 40/20 704/9
2023/0376537 A1* 11/2023 Bansal ............. G06F 16/90332
2024/0193657 A1* 6/2024 Chandrababu ..... G06Q 30/0617
2024/0411994 A1* 12/2024 Siracusano ........... G06F 40/295

OTHER PUBLICATIONS

Mihaila, George A., Louiqa Raschid, and Maria-Esther Vidal. "Source selection and ranking in the websemantics architecture using quality of data metadata." Advances in Computers, vol. 55, Elsevier, 2002, 87-118. (Year: 2002).*

Microsoft Learn, "Build language model pipelines with memory." https://learn.microsoft.com/en-us/azure/architecture/ai-ml/openai/guide/language-model-pipelines>. Retrieved from the Internet on Sep. 15, 2023.

Microsoft, Learn, "What is Semantic Kernel?" Web page downloaded at <https://learn.microsoft.com/en-us/semantic-kernel/overview/>. Retrieved from the Internet on Dec. 15, 2023.

LlamaIndex, "Welcome to LlamaIndex" Web page downloaded at <https://docs.llamaindex.ai/en/stable/#why-llamaindex>. Retrieved from the Internet on Dec. 15, 2023.

Python, Langchain, "Introduction" Web page downloaded at <https://python.langchain.com/docs/get_started/introduction>. Retrieved from the Internet on Dec. 15, 2023.

* cited by examiner

SYSTEMS AND METHODS FOR MANAGING DECENTRALIZED DATA SOURCES IN GENERATIVE ARTIFICIAL INTELLIGENCE PIPELINES

FIELD OF THE DISCLOSURE

The present disclosure is directed to improvements to generative artificial intelligence (AI) systems, specifically to using decentralized data sources with generative AI pipelines.

BACKGROUND

Pre-trained large language models (LLMs) can be used to answer user queries with machine-generated content. Because they are pre-trained, conventional LLMs are unable to incorporate new or proprietary data into the model to answer queries. It may not be feasible for organizations to train and operate their own LLMs with new or proprietary data. One solution to this problem is retrieval-augmented generation (RAG). RAG supplements user queries with relevant supplied data to enable LLMs to provide improved responses. However, conventional RAG techniques have limited ability to identify and use data from decentralized data sources.

The systems and methods disclosed herein provide solutions to these problems and others.

SUMMARY

The following relates to using generative AI pipelines, such as RAG pipelines, with decentralized data sources. A generative AI pipeline includes the necessary software components for receiving a user query, fetching relevant external data, and submitting a prompt to cause the LLM to answer the user query based on provided relevant external data. Using decentralized data sources enables organizations to deploy a generative AI pipeline that accesses a plurality of data sources in a federated model.

In one aspect, a computer-implemented method for providing a decentralized knowledge engine for use with a plurality of external data sources to respond to a user query may be provided. The method may include: (1) receiving a user query; (2) causing an intent associated with the user query to be determined; (3) selecting one or more relevant external data sources from the plurality of external data sources based on a comparison of the intent with external data source metadata, wherein the external data source metadata describes information available from the plurality of external data sources; (4) retrieving unstructured text from at least one of the one or more relevant external data sources; (5) retrieving structured data from at least one of the one or more relevant external data sources; (6) causing relevant information from the unstructured text and structured data to be extracted; (7) sending one or more augmented user queries to a large language model (LLM), the one or more augmented user queries collectively comprising (i) the relevant information, (ii) the user query, and (iii) a prompt to cause the LLM to generate a response; and/or (8) outputting the response.

In one aspect, a computer system for providing a decentralized knowledge engine for use with a plurality of external data sources to respond to a user query may be provided. The computer system may include one or more processors and one or more memories having stored thereon computer-executable instructions that, when executed by the one or more processors, cause the one or more processors to: (1) receive a user query; (2) cause an intent associated with the user query to be determined; (3) select one or more relevant external data sources from the plurality of external data sources based on a comparison of the intent with external data source metadata, wherein the external data source metadata describes information available from the plurality of external data sources; (4) retrieve unstructured text from at least one of the one or more relevant external data sources; (5) retrieve structured data from at least one of the one or more relevant external data sources; (6) cause relevant information from the unstructured text and structured data to be extracted; (7) send one or more augmented user queries to a large language model (LLM), the one or more augmented user queries collectively comprising (i) the relevant information, (ii) the user query, and (iii) a prompt to cause the LLM to generate a response; and/or (8) output the response.

In yet another aspect, a computer-readable medium includes computer-executable instructions that, when executed, cause a computer to: (1) receive a user query; (2) cause an intent associated with the user query to be determined; (3) select one or more relevant external data sources from the plurality of external data sources based on a comparison of the intent with external data source metadata, wherein the external data source metadata describes information available from the plurality of external data sources; (4) retrieve unstructured text from at least one of the one or more relevant external data sources; (5) retrieve structured data from at least one of the one or more relevant external data sources; (6) cause relevant information from the unstructured text and structured data to be extracted; (7) send one or more augmented user queries to a large language model (LLM), the one or more augmented user queries collectively comprising (i) the relevant information, (ii) the user query, and (iii) a prompt to cause the LLM to generate a response; and/or (8) output the response.

In addition, the disclosed methods, systems, and computer-readable media include improvements in computer functionality or improvements to other technologies at least because they improve generative AI techniques by providing a generative AI pipeline that uses decentralized data sources. That is, computer performance may be improved by using the disclosed methods, systems, and computer-readable media to interface with decentralized data sources and LLMs instead of conventional generative AI pipelines. Generative AI pipelines using a plurality of decentralized data sources may operate more efficiently than attempting to maintain a comprehensive, updated centralized data source for a generative AI pipeline.

The methods, systems, and computer-readable media thus offer several benefits. In particular, the methods, systems, and computer-readable media use a standardized generative AI pipeline that may interface with a plurality of data source types.

The methods, systems, and computer-readable media represent an improvement to an existing technology or technologies, specifically technologies for using custom data with an LLM to obtain answers to user queries. Technologies do not currently exist for standardized generative AI pipelines that may use a plurality of decentralized data sources.

The methods, systems, and computer-readable media therefore do not merely recite the performance of some business practice known from the pre-computer world along with the requirement to perform it on a computer. Instead, the methods, systems, and computer-readable media incorporate generative AI pipelines for enabling use of new or custom data with LLMs. Thus, the methods, systems, and computer-readable media are necessarily rooted in computer technology to overcome a problem specifically arising in LLMs by means of specific features other than what is well-understood, routine, conventional activity in the field, as further described herein.

BRIEF DESCRIPTION OF THE FIGURES

The figures described below depict various aspects of the systems, methods, and computer readable media disclosed therein. It should be understood that each figure depicts one embodiment of a particular aspect of the disclosed systems, methods, and media, and that each of the figures is intended to accord with a possible aspect thereof. Further, wherever possible, the following description refers to the reference numerals included in the following figures, in which features depicted in multiple figures are designated with consistent reference numerals.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Exemplary Computing Environment

Figure 1:
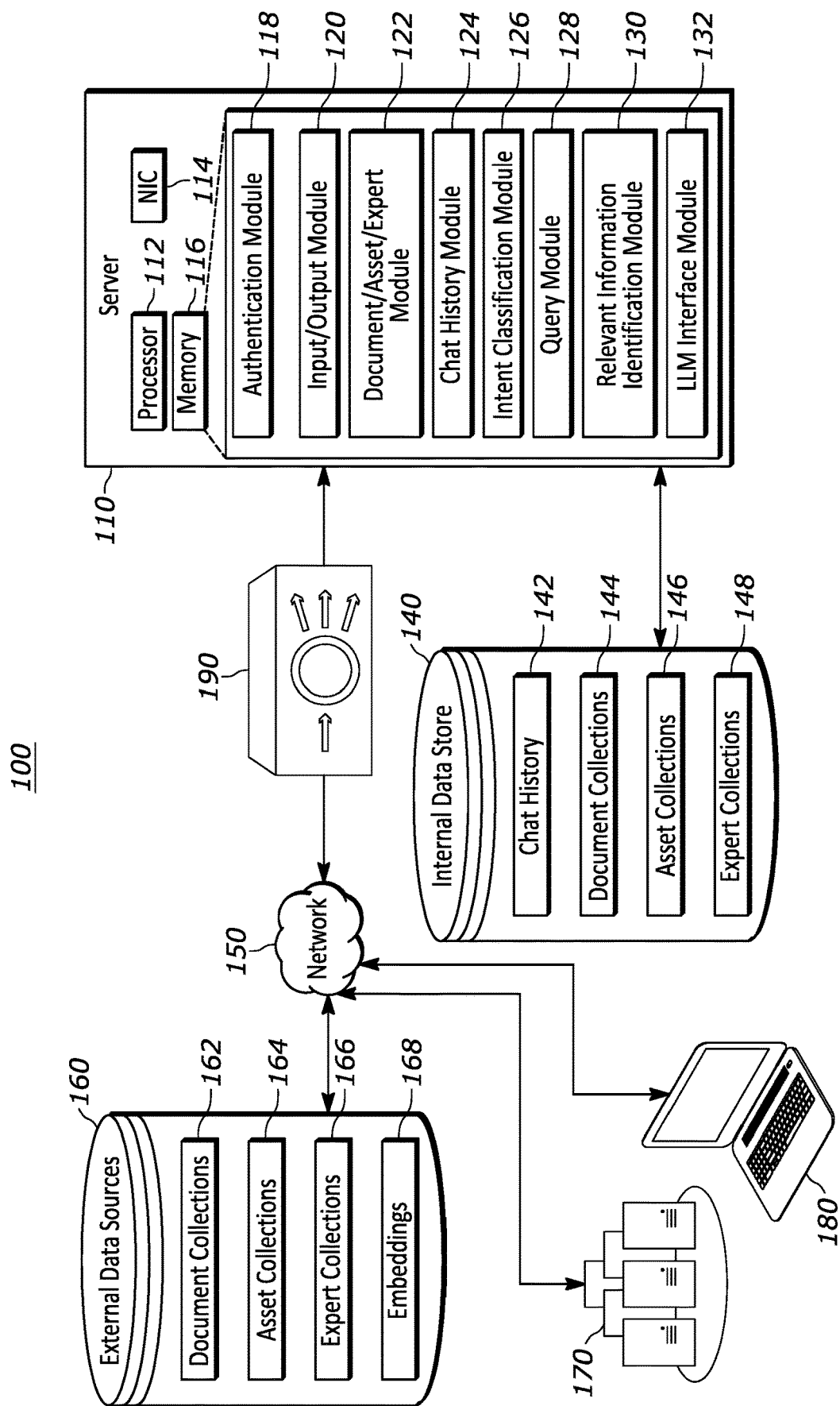
FIG. 1 depicts an exemplary computing environment in which the techniques disclosed herein may be implemented, according to some aspects.

FIG. 1 depicts an exemplary computing environment 100 in which the techniques disclosed herein may be implemented, according to some aspects. The computing environment 100 may include one or more servers 110, internal data stores 140, networks 150, external data sources 160, LLM services 170, user devices 180, and load balancers 190.

The server 110 may be an individual server, a group (e.g., cluster) of multiple servers, or another suitable type of computing device or system (e.g., a collection of computing resources). The server 110 may be located within the enterprise network of an organization that owns or operates the generative AI pipeline or hosted by a third-party provider. The server 110 may be included in a cloud provider environment, such as a public cloud (e.g., Alibaba Cloud, Amazon Web Services (AWS), Google Cloud, IBM Cloud, Microsoft Azure, etc.), a private cloud, or a hybrid cloud. In some aspects, one or more components of the server 110 may be embodied by one or more virtual machines.

The server 110 may include one or more processors 112. The one or more processors 112 may include any suitable number of processors and processor types, such as central processing units (CPUs), graphics processing units (GPUs), and field programmable gate arrays (FPGAs). The one or more processors 112 may be configured to execute software instructions stored in a memory.

The server 110 may include a network interface card (NIC) 114. The NIC 114 may include any suitable number and type of NICs, such as wired (e.g., Ethernet) and wireless (e.g., WiFi) and facilitate bidirectional communication over the network 150 and/or with the internal data store 140.

The server 110 may include memory 116. The memory 116 may include one or more persistent memories (e.g., hard drive or solid state drive) and/or transitory memories (e.g., random access memory (RAM) or cache). The memory 116 may store one or more sets of computer executable instructions, such as modules 118-132. The memory 116 may store an operating system (OS) (e.g., Microsoft Windows, Linux, UNIX, MacOS, etc.) capable of facilitating the functionalities, apps, methods, modules, or other software as discussed herein.

The internal data store 140 may be owned or operated by the same organization that owns or operates the generative AI pipeline. The internal data store 140 may include a relational database (e.g., a PostgreSQL database), a non-relational datastore (e.g., a NoSQL database), a vector database (e.g., Pinecone), a web server, file server, and/or application server. In some aspects, the internal data store 140 may be located remotely from the server 110, such as in a public cloud environment. The internal data store 140 may store one or more data sources, such as a chat history 142, document collections 144, asset collections 146, and/or expert collections 148. Chat history 142 may include one or more records of the queries submitted by users and the responses output by server 110. Document collections 144 may include one or more sets of documents, such as web pages, PDFs, Word documents, text files, or any other suitable file containing text. Asset collections 146 may include one or more sets of databases, data sets, applications, models, knowledge graphs, or any other suitable sources of data. Expert collections 148 may include or more sets of identifying information for experts, corpora of experts' works, and/or experts' biographies for one or more subject matter experts. For example, any of the document collections 144, asset collections 146, or expert collections 148 may include data from a catalogue of documents, assets, or experts, such as a data set of assets and descriptions of the respective assets (e.g., applications or models for generating predictions or other data).

The external data sources 160 may include a relational database, a non-relational datastore, a vector database, a web server, file server, and/or application server. The external data sources 160 may store one or more data sources, such as document collections 162, asset collections 164, expert collections 166, and/or embeddings 168. Each collection of the document collections 144, document collections 162, asset collections 146, asset collections 164, expert collections 148, and expert collections 166 may comprise metadata describing the information available in the collection.

The LLM service 170 may be owned or operated by an LLM provider. The LLM service 170 may include an LLM model. An LLM is a type of artificial intelligence (AI)

algorithm that uses deep learning techniques to perform a number of natural language processing (NLP) tasks, such as understanding, summarizing, generating, and/or predicting new content. LLMs generate output by predicting the next token or word in a sequence. LLMs are pre-trained with vast data sets. In one aspect, the LLM service 170 may receive a prompt and generate a natural language response. The LLM service 170 may include OpenAI's GPT-3 and GPT-4, Google's BERT, Microsoft's Turing NLG, or any other suitable LLM. The LLM service 170 may include one or more AI models. The one or more AI models may include an embedding model, such as text-embedding-ada-002, that receives a text chunk as an input and generates an embedding.

The user device 180 may be any suitable computing device operated by a user to interface with the server 110. For example, the user device 180 may include one or more servers, personal computers, smartphones, tablets, wearables, etc.

The network 150 may be a single communication network or may include multiple communication networks of one or more types (e.g., one or more wired and/or wireless local area networks (LANs), and/or one or more wired and/or wireless wide area networks (WANs), such as the Internet). The network 150 may enable bidirectional communication between the server 110 and the external data store 160, the LLM service 170, and the user device 180.

The load balancer 190 may comprise one or more load balancers, such as Amazon's Application Load Balancer (ALB). The load balancer 190 may distribute a plurality of incoming user requests among a plurality of servers 110. The load balancer 190 may distribute a plurality of outgoing LLM queries among a plurality of LLM services 170.

Exemplary Computing Modules

The memory 116 may store one or more computing modules, including an authentication module 118, an input/output (I/O) module 120, a document/asset/expert module 122, a chat history module 124, an intent classification module 126, a query module 128, a relevant information identification module 130, an LLM interface module 132, and any other suitable modules. Each of the modules 118-132 implements specific functionality related to the present techniques, as will be described further below. The modules may comprise machine code, assembly code, byte code, and/or interpreted code. The modules may be written in Python, C++, JavaScript, or any other suitable programming language. The modules may incorporate machine learning libraries, such as TensorFlow, PyTorch, HuggingFace, and/or scikit-learn. The modules may be implemented using an LLM framework, such as LangChain, Dust, and Steamship.

In some aspects, the authentication module 118 may include instructions for authenticating users via one or more authentication methods to the server 110. For example, the authentication module 118 may include software client libraries for accessing the organization's own identity provider. The authentication module 118 may store one or more cookies or persistent sessions in association with each chat session. Generally, the authentication module 118 may include a software library for authenticating via any suitable authentication mechanism using stored credentials. The authentication module 118 may receive usernames and passwords from users (e.g., via the I/O module 120). The authentication module 118 may maintain and enforce access control rules that restrict users' access to documents, assets, and/or experts. For example, the authentication module 118 may prevent unauthorized users from accessing proprietary information contained in certain documents and assets. The authentication module 118 may include instructions for authenticating one or more of the other modules to the external data sources 160 and/or LLM service 170. The authentication module 118 may use a username and password, API key, cryptographic key, or other suitable authentication credentials to authenticate to the external data sources 160 and/or LLM service 170.

In some aspects, the I/O module 120 may include instructions that enable a user to access (e.g., via the user device 180) the server 110. For example, the user may be affiliated with the organization that owns or operates the server 110. The user may access the server 110 via the I/O module 120 to submit a query and receive an answer to the query. The I/O module 120 may include instructions for generating one or more graphical user interfaces (GUIs), such as a web-based or app GUI. The GUI may contain an input text field for receiving the query from the user. The GUI may contain an output text field for displaying the answer. The GUI may contain one or more input fields to allow the user to manually choose document sources, asset sources, and/or experts in answering the query. The I/O module 120 may include APIs, such as REST APIs, to receive input and provide output to a third-party application.

In some aspects, the document/asset/expert module 122 may include instructions for retrieving copies of and/or scraping text or data from the document collections 162 and asset collections 164 located in one or more external data sources 160. The document/asset/expert module 122 may access documents from document collections 162 and assets from asset collections 164 using HTTP/HTTPS, Microsoft file sharing, SQL queries, and/or any other suitable method.

In some aspects, the document/asset/expert module 122 may include instructions for splitting documents or assets into chunks and generating embeddings of those chunks. The document/asset/expert module 122 may split each document of document collections 144 and document collections 162 into a plurality of text chunks and split each asset of asset collections 146 and asset collections 164 into a plurality of text chunks and/or data chunks. The text chunks may be paragraph-sized, sentence-sized, fixed-sized (e.g., 50 words) or any other appropriate size. The document/asset/expert module 122 may use a tool, such as Natural Language Toolkit (NLTK) or Sentence Splitter, to perform the splitting. In some aspects, document/asset/expert module 122 may transmit the documents and/or assets, via the LLM interface module 132, to the LLM service 170 and receive text chunks and/or asset chunks from the LLM service 170.

In some aspects, the document/asset/expert module 122 may include instructions for generating embeddings from each text chunk and/or data chunk. The embeddings represent the text chunks and data chunks as multi-dimensional (e.g., 768 or 1,536 dimension) vectors of numerical values. The document/asset/expert module 122 may use Word2Vec, Bidirectional Encoder Representations from Transformers (BERT), or other suitable algorithms to generate the embeddings. Alternatively, the document/asset/expert module 122 may transmit the text chunks and/or data chunks, via the LLM interface module 132, to the LLM service 170 (e.g., using the text-embedding-ada-002 model) and receive embeddings from the LLM service 170. The document/asset/expert module 122 may save the embeddings into embeddings 168 in the external data sources 160. The embeddings 168 may comprise a vector database, such as ChromaDB, Pinecone, or Milvus.

In some aspects, the chat history module 124 may include instructions for saving and retrieving chat history 142 in the internal data store 140. The chat history module 124 may store queries and answers from a current chat session into chat history 142. The chat history 142 may be a relational database, non-relational datastore, text file, or other suitable storage medium. The chat history module 124 may retrieve all or a portion of the current chat session or one or more prior chat sessions from chat history 142. The chat history module 124 may summarize the retrieved chat history.

In some aspects, the intent classification module 126 may include instructions for determining an intent of the query. The intent classification module 126 may receive the query or the query plus retrieved chat history and classify the query into one or more of a plurality of pre-defined intents. The intent classification module 126 may use semantic search to determine intent. The intent determination semantic search may include (1) generating an embedding of each pre-defined intent; (2) generating an embedding of the user query; and (3) comparing the user query embedding to the intent embeddings in embeddings 168 using clustering techniques, such as k-means clustering, to identify relevant intent. The intent classification module 126 may perform a keyword search to determine intent by (1) selecting one or more keywords from the user query; and (2) searching for the keywords in metadata of one or more of the document collections 144, document collections 162, asset collections 146, asset collections 164, expert collections 148, and expert collections 166. The intent classification module 126 may (via the LLM interface module 132) submit the user query and the pre-defined intents to the LLM service 170, e.g., using the text-davinci-003 model, and receive intents as output. The intents may be used to select which document, asset, or expert sources will be used to answer the query. For example, the user query may ask for a financial summary of Acme Corp., and the intent classification module 126 may classify the intent of the user query as public company financial information.

In some aspects, the query module 128 may include instructions for rephrasing the original user query into a canonical form. The query module 128 may replace acronyms in the original user query with expanded text and internal company jargon with standard terminology. The query module 128 may incorporate information from the chat history 142 obtained by the chat history module 124 into the user query. For example, a first user query may have asked "What is the current stock price of Acme Corp.?," and a second user query may ask "What date was its initial public offering?" The query module 128 may replace "its" with "Acme Corp." in the second user query.

In some aspects, the query module 128 may include instructions for generating an augmented user query from the rephrased user query. The query module 128 may supplement the rephrased user query with information obtained (via the document/asset/expert module 122 and the relevant information identification module 130) from document collections 144, document collections 162, asset collections 146, asset collections 164, and/or other suitable sources to generate a prompt. For example, a rephrased user query may ask a question regarding Acme Corp.'s most recent earnings report. The query module 128 may append the contents of Acme Corp.'s earnings report when generating the augmented user query. The query module 128 may summarize an augmented user query in order to satisfy a maximum word or token limit of the LLM service 170. For example, the query module 128 may implement map reduce functionality to split Acme Corp.'s earnings report document into a plurality of text chunks and summarize each text chunk to generate a summarized output text suitable for submission to the LLM service 170. The query module 128 may implement prompt engineering to supplement the augmented user query. For example, the query module 128 may add text instructing the LLM service 170 to answer the user query with the supplemental information instead of relying upon pre-trained data.

In some aspects, the relevant information identification module 130 may include instructions for identifying one or more documents, assets, and/or experts that are relevant to the user query. The relevant information identification module 130 may use a semantic search to identify the relevant documents, assets, and experts. The semantic search may include (1) generating an embedding of the user query; and (2) compare the user query embedding to the document and asset embeddings in embeddings 168 using clustering techniques, such as k-means clustering, to identify relevant documents and/or assets. Alternatively, the relevant information identification module 130 may transmit the query embedding, the document embeddings, and/or the data embeddings, via the LLM interface module 132, to the LLM service 170 and receive semantic search scores from the LLM service 170.

The relevant information identification module 130 may perform topic modeling to identify the relevant documents, assets, and experts. The topic modeling may include (1) performing topic modeling on the user query to identify one or more topic keywords; and (2) searching the document collections 144, asset collections 146, expert collections 148, document collections 162, asset collections 164, and/or expert collections 166 with the topic keywords to identify relevant documents, assets, and/or experts. The relevant information identification module 130 may retrieve the relevant documents and/or relevant assets from the document collections 144, asset collections 146, expert collections 148, document collections 162, asset collections 164, and/or expert collections 166.

In some aspects, the relevant information identification module 130 may include instructions for identifying relevant text chunks and/or data chunks from the relevant documents and/or relevant assets. The relevant information identification module 130 may use a semantic search to compare the embedding of the user query to embeddings of the text chunks and/or data chunks to identify relevant text chunks and/or relevant data chunks. Alternatively, the relevant information identification module 130 may transmit the query embedding, the text chunk embeddings, and/or the data chunk embeddings, via the LLM interface module 132, to the LLM service 170 and receive semantic search scores from the LLM service 170.

In some aspects, the LLM interface module 132 may transmit prompts to and receive answers from the LLM service 170. The LLM interface module 132 may transmit, for each relevant text chunk and relevant data chunk, a prompt that includes the user query and the relevant text chunk and/or relevant data chunk to the LLM service 170 and may receive relevant information from the relevant text chunk and/or relevant data chunk. The LLM interface module 132 may concurrently transmit a plurality of prompts to the LLM service 170. The LLM interface module 132 may transmit a prompt that includes the user query and each relevant information and may receive an answer.

Exemplary External Data Sources

Figure 2:
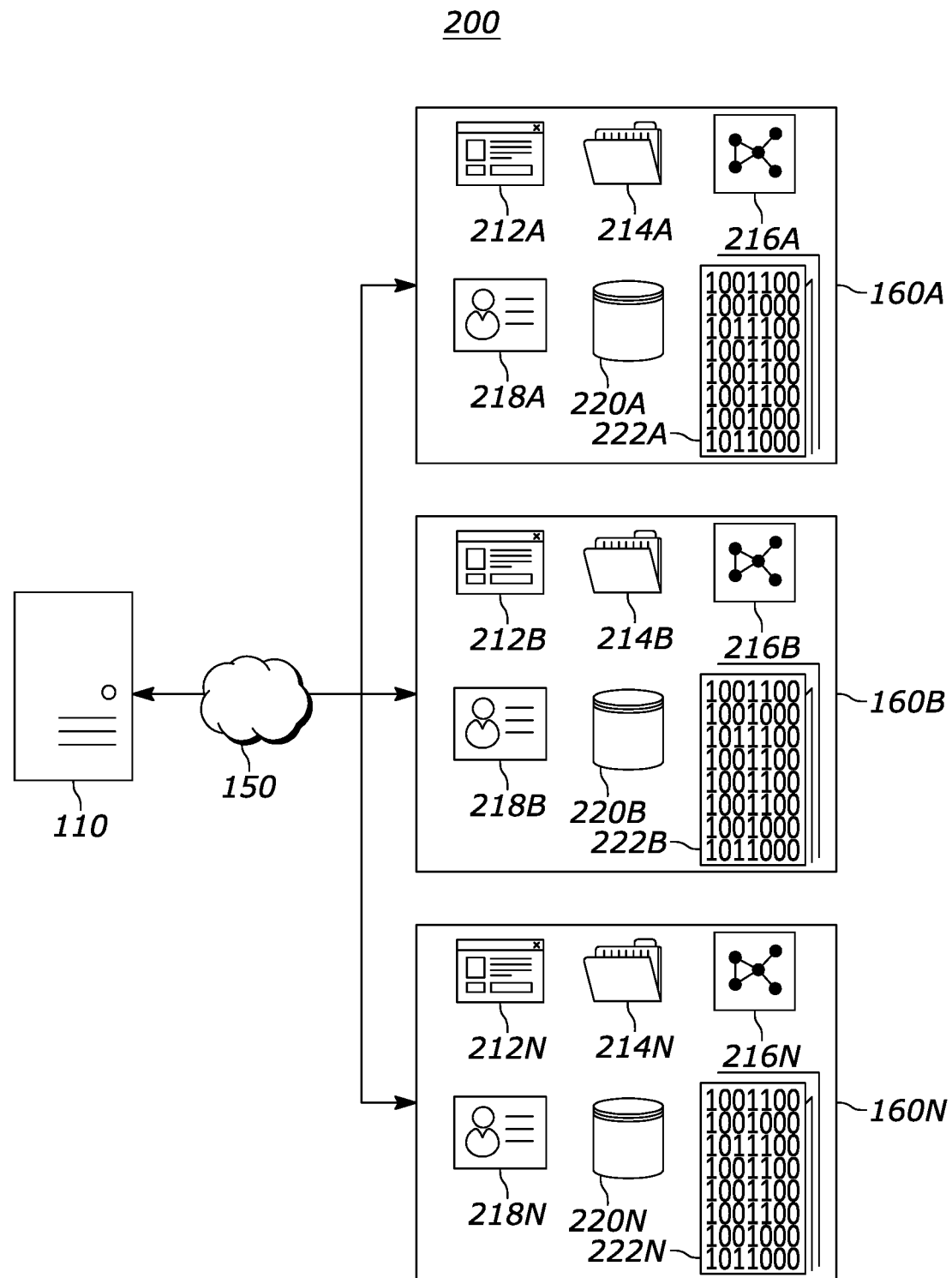
FIG. 2 depicts an exemplary federated data environment in which the techniques disclosed herein may be implemented, according to some aspects.

FIG. 2 depicts an exemplary federated data environment 200 in which the techniques disclosed herein may be implemented, according to some aspects. The federated data environment 200 may include the server 110, the network 150, and one or more external data sources 160A-160N.

In some aspects, the external data sources 160A-160N may be owned or operated by third-parties. A third-party may own or operate one or more of the external data sources 160A-160N. The external data sources 160A-160N may be publicly accessible or may be accessible only to specified parties via authentication. The external data sources 160A-160N may be hosted in a private cloud, public cloud, or on one or more physical servers.

In some aspects, the external data sources 160A-160N may include application servers 212A-212N. The application servers 212A-212N may include a client/server application, e.g., SAP enterprise resource planning (ERP) software, a web server, or any other suitable application. The application server s212A-212N may receive an input and output text or data.

In some aspects, the external data sources 160A-160N may include file servers 214A-214N. The file servers 214A-214N may include an FTP server, SharePoint server, Google Drive site, or any other suitable service or site. The file servers 214A-214N may host a plurality of text files, Word documents, PDFs, etc.

In some aspects, the external data sources 160A-160N may include knowledge graphs 216A-216N. The knowledge graphs 216A-216N may include a GraphDB, Virtuoso, or any other suitable knowledge graph. The knowledge graphs 216A-216N may host text and/or data.

In some aspects, the external data sources 160A-160N may include expert biographies 218A-218N. The expert biographies 218A-218N may be hosted as documents, as Microsoft Exchange contacts, relational database entries, etc. The expert biographies 218A-218N may include names, contact information, professional and/or educational backgrounds, areas of expertise, affiliations, authored works, etc. In some embodiments, the expert biographies 218A-218N may include references or links to works by the respective experts to facilitate identification of relevant documents, which may be stored or identified in the respective file servers 214A-214N or databases 220A-220N.

In some aspects, the external data sources 160A-160N may include databases 220A-220N. The databases 220A-220N may include a relational database, such as postgreSQL, Microsoft SQL, or Oracle. The databases 220A-220N may include text and/or data. Such databases may include any type of datastores, including relational (e.g., SQL databases) or non-relational datastores (e.g., NoSQL databases).

In some aspects, the external data sources 160A-160N may include data files 222A-222N. The data files 222A-222N may include comma separated values (CSV) format, JSON format, or binary format.

In some aspects, the document/asset/expert module 122 or any other suitable program on the server 110 may access external data sources 160A-160N. The document/asset/expert module 122 may act as a universal interface for retrieving documents, assets, and/or experts from the external data sources 160A-160N. The document/asset/expert module 122 may include instructions for requesting and receiving information from application servers 212A-212N, file servers 214A-214N, knowledge graphs 216A, expert biographies 218A-218N, databases 220A-220N, and data files 22A-222N. The document/asset/expert module 122 may retrieve documents and files or may scrape text and data from the documents and files. The document/asset/expert module 122 may use FTP, HTTP, SQL, or other suitable protocols for retrieving information from the external data sources 160A-160N.

Exemplary RAG Pipeline Flow

FIGS. 3A-3F depict a flow diagram for an exemplary RAG pipeline 300 in which the techniques disclosed herein may be implemented, according to some aspects. One or more steps of the RAG pipeline 300 may be implemented as a set of instructions stored on a computer-readable memory and executable on one or more processors. The RAG pipeline may be implemented in whole or in part by the server 110, internal data store 140, external data sources, 160, LLM service 170, and/or user device 180.

In some aspects, the RAG pipeline 300 may comprise interpreted code, source code, and/or pre-compiled executables and libraries configured to execute on a computing system, such as server 110. The RAG pipeline 300 may be packaged and configured to be deployed by organizations without requiring any modification or reprogramming of any source code of the RAG pipeline 300. The RAG pipeline 300 may be customized using configuration settings to enable operation of the packaged RAG pipeline 300 for an organization. For example, configuration settings may specify identities, credentials, and other settings for the RAG pipeline 300 to interface with the internal data store 140, external data sources 160, and LLM service 170.

Figure 3A:
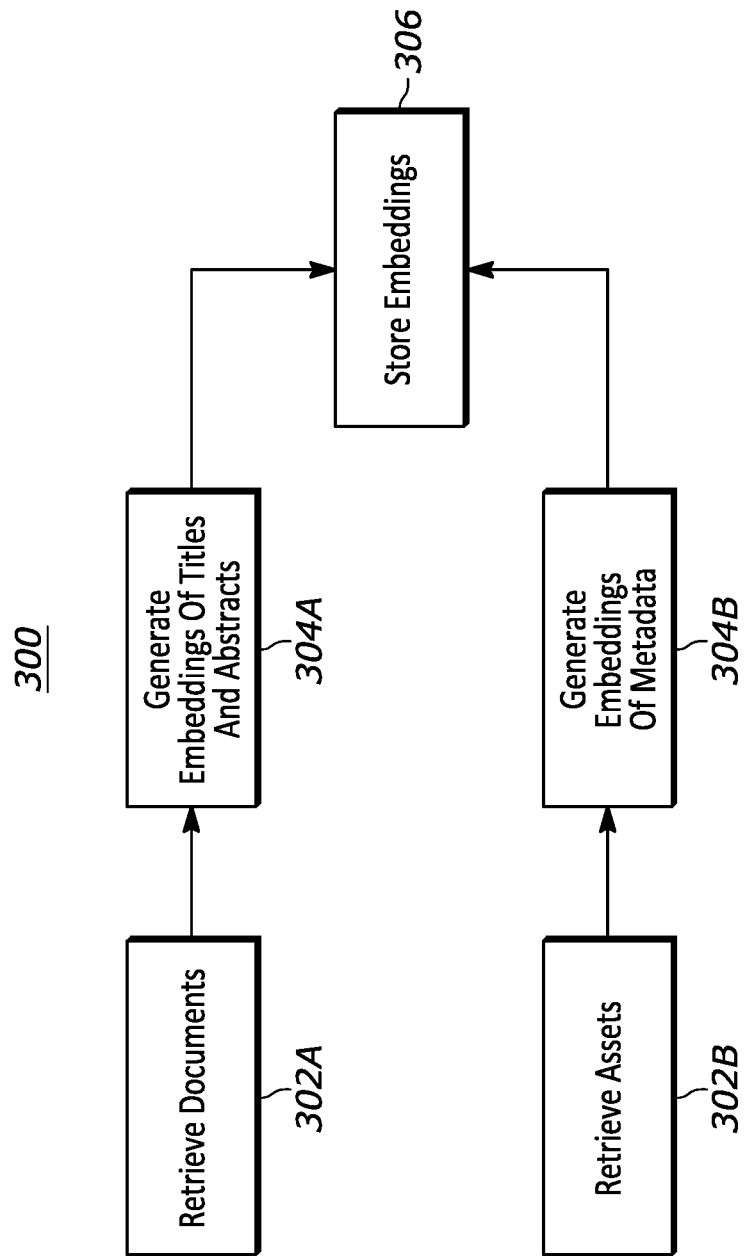
FIGS. 3A-3F depict exemplary flow diagrams for portions of an exemplary RAG pipeline, according to some aspects.

FIG. 3A illustrates an aspect of the RAG pipeline 300 involving generating and storing embeddings for documents or other assets. In some aspects, the RAG pipeline 300 may include at block 302A retrieving one or more documents and/or retrieving one or more assets at block 302B. Retrieving the documents and/or assets may be performed by the document/asset/expert module 122 or any other suitable program. The server 110 may retrieve (i.e., pull) the documents and assets, or the documents and assets may be received automatically from one or more document or asset sources (i.e., push). The documents and assets may be retrieved a single time or on a periodic basis. The documents may comprise scraped text or files. The assets may comprise retrieved data, e.g., from database queries, or files comprising data. The documents may be retrieved from document collections 162, document collections 144, or any other suitable source. The assets may be retrieved from asset collections 164, asset collections 146, or any other suitable source.

In some aspects, the RAG pipeline 300 may include at block 304A generating embeddings of the document titles and document and/or generating embeddings of the asset metadata at block 304B. Generating the embeddings may be performed by the document/asset/expert module 122 or any other suitable program. An embedding may be generated for each title, abstract, and metadata.

In some aspects, the RAG pipeline 300 may include at block 306 storing the embeddings. Storing the embeddings may be performed by the document/asset/expert module 122 or any other suitable program. The embeddings may be saved into embeddings 168 or any other suitable data store.

Figure 3B:
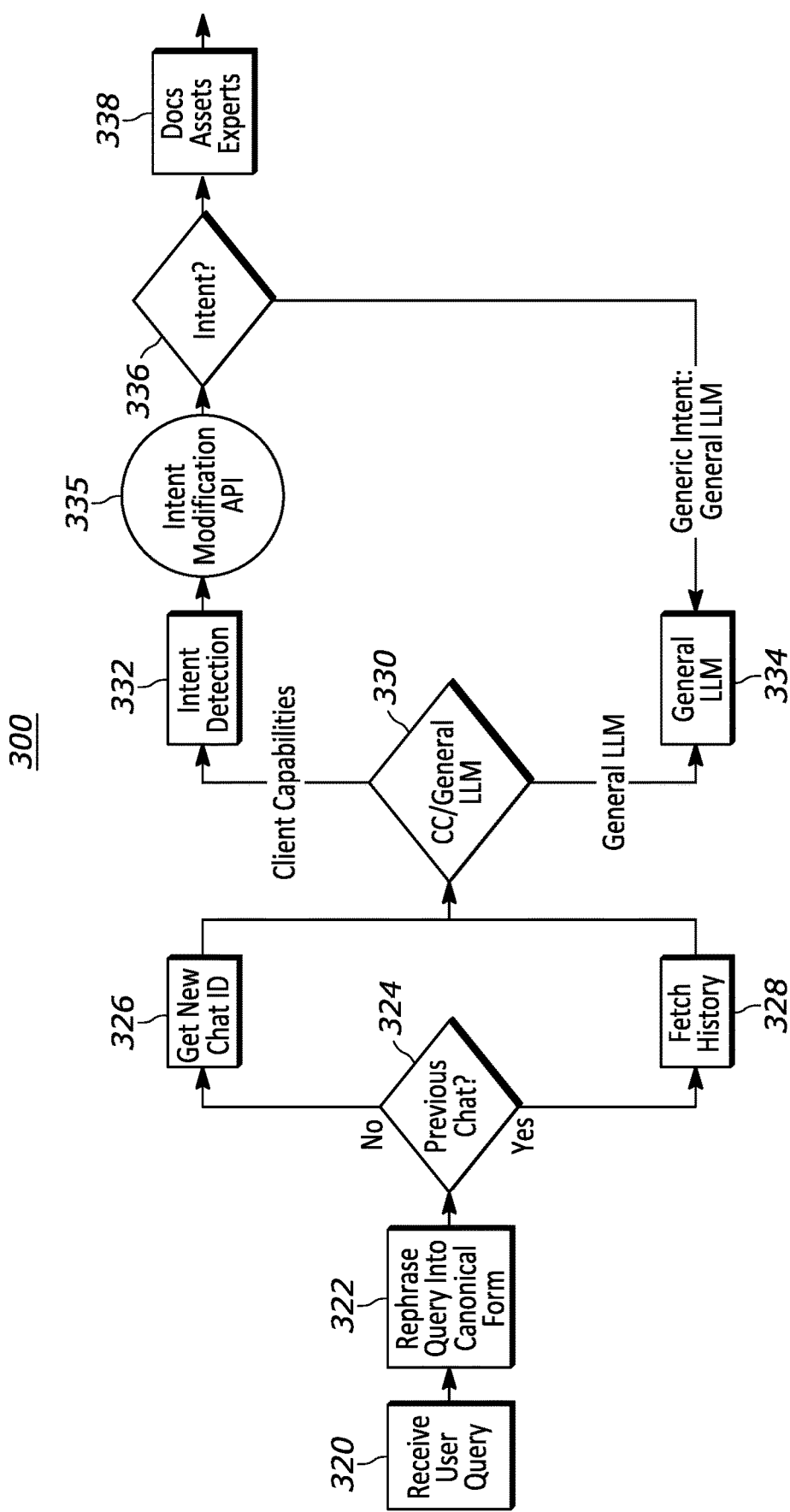

FIG. 3B illustrates an aspect of the RAG pipeline 300 involving receiving and processing a user query. In some aspects, the RAG pipeline 300 may include at block 320 receiving a user query. The user query may be received by the input/output module 120 or any other suitable program. The user query may be received from the user device 180 or from a generative AI pipeline, such as RAG pipeline 300. User queries may be distributed among a plurality of servers 110 by the load balancer 190. The user query may comprise a question or a request. The user query may comprise a selection or deselection of one or more document collections, expert collections, or asset collections. The user query may comprise a selection of whether to provide relevant information to the LLM to assist in answering the query (i.e., use RAG) or submit the query without providing relevant information (i.e., do not use RAG).

In some aspects, the RAG pipeline 300 may include at block 322 rephrasing the original user query into a canonical form. The user query may be rephrased by the query module 128 or any other suitable program. Rephrasing the user query may comprise expanding acronyms or replacing an organization's internal jargon with standard terminology.

In some aspects, the RAG pipeline 300 may include at block 324 determining whether the user query relates to a previous chat. The relation to a previous chat may be determined by the query module 128 or any other suitable program. The determination may be based upon the existence of a chat ID, cookie, or other session identifier, selection of a prior session by the user, or a semantic search of the user query in the chat history 142.

In some aspects, if the user query relates to a previous chat then the RAG pipeline 300 may include at block 328 fetching the chat history. The chat history may be fetched by the chat history module 124 or any other suitable program. The chat history may be fetched from chat history 142 or any other suitable source.

In some aspects, if the user query does not relate to a previous chat then the RAG pipeline 300 may include at block 326 generating a new chat ID. The chat ID may be generated by the chat history module 124 or any other suitable program. The chat ID may be transmitted to the user device 180.

In some aspects, the RAG pipeline 300 may include at block 330 determining whether to use RAG or not use RAG. The use of RAG may be determined by the query module 126 or any other suitable program. The determination may be based upon an explicit selection or deselection by the user.

In some aspects, if the determination is not to use RAG then the RAG pipeline 300 may include at block 334 submitting the user query to a general LLM system. The user query may be submitted by LLM interface module 132 or any other suitable program. The general LLM system may be LLM service 170 or any other available LLM service. A portion, a summary, or all of the chat history may be submitted to the general LLM system with the user query.

In some aspects, if the determination is to use RAG then the RAG pipeline 300 may include at block 332 detecting the intent of the user query. The intent detection may be performed by the intent classification module 126 or any other suitable program. The intent detection 332 may be based upon the user query, the chat history, and/or the selection or deselection of document sources, asset sources, or experts. The intent may be classified into one or more pre-defined intent categories.

In some aspects, the RAG pipeline 300 may include an intent modification API 335. The intent modification API 335 may be provided by the intent classification module 126 or any other suitable program. The intent modification API 335 may enable modification of the intent detected at block 332. For example, modification of the detected intent may include adding, removing, or modifying an intent or reclassifying an intent.

In some aspects, the RAG pipeline 300 may include at block 336 determining whether the intent is the use RAG or not use RAG for handling the user query. If the determination is not to use RAG, then the RAG pipeline 300 may submit the query to a general LLM system at block 334.

In some aspects, if the intent is to use RAG then the RAG pipeline 300 may include at block 338 selecting one or more of the document collections 144, asset collections 146, expert collections 148, document collections 162, asset collections 164, and/or expert collections 166 based upon the intent. The document collections 144, asset collections 146, expert collections 148, document collections 162, asset collections 164, and/or expert collections 166 may be selected by the document/asset/expert module 122 or any other suitable program. The document collections 144, asset collections 146, expert collections 148, document collections 162, asset collections 164, and/or expert collections 166 may comprise metadata describing the information provided by a document collection, an asset collection, or an expert collection. The intent may be compared to the metadata of the document collections 144, asset collections 146, expert collections 148, document collections 162, asset collections 164, and/or expert collections 166 using a keyword search or semantic search to identify the most relevant document, asset, or expert collections. Document collections, asset collections, and expert collections may be added or removed based upon the selection or deselection input by the user at block 320.

Figure 3C:
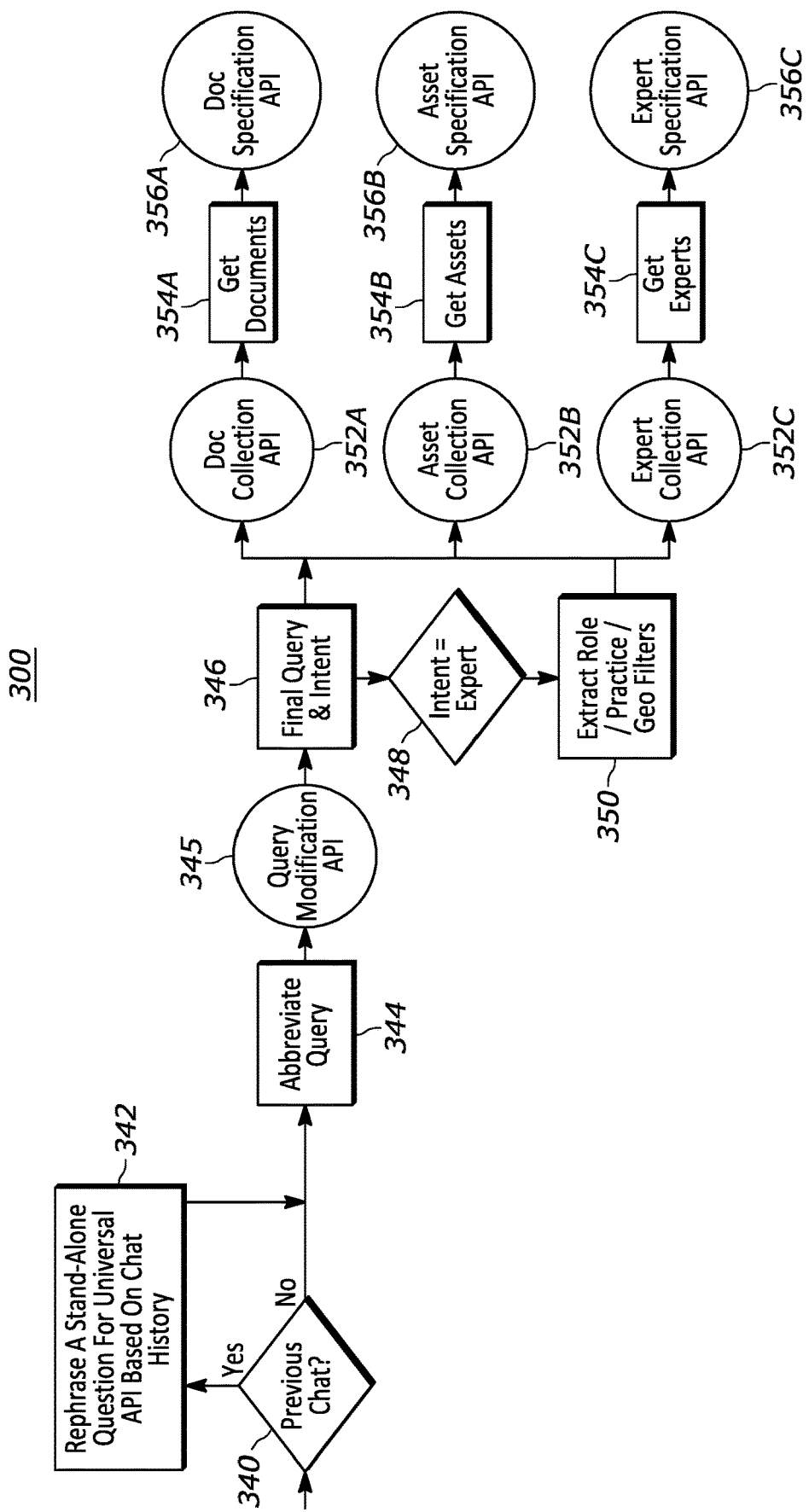

FIG. 3C illustrates an aspect of the RAG pipeline 300 involving modifying the received user query, determining one or more data source intents, and collecting data from the intended data sources (e.g., documents, assets, or experts). In some aspects, the RAG pipeline 300 may include at block 340 determining whether there have been previous user queries in the current chat session. The determination of previous user queries may be performed by the chat history module 124 or any other suitable program. The previous user queries may be stored in chat history 142.

In some aspects, if there have been previous user queries in the current chat session, then the RAG pipeline 300 may include at block 342 rephrasing the user query based upon the chat history. The user query may be rephrased by the query module 128 or any other suitable program. Rephrasing the user query may include replacing pronouns in the user query with their antecedents from the chat history. Rephrasing the user query may include supplementing the user query with a summary of or relevant portions of the chat history.

In some aspects, the RAG pipeline 300 may include at block 344 abbreviating the user query, which may be the rephrased user query. The user query may be abbreviated by the query module 128 or any other suitable program. The user query may be abbreviated to comply with a word or token limit of the LLM service 170.

In some aspects, the RAG pipeline 300 may include a query modification API 345. The query modification API 345 may be provided the query module 128 or any other suitable program. The query modification API 345 may enable modification of the user query. For example, modification of the user query may include adding, removing, or modifying text of the user query, which may be the rephrased user query or the abbreviated user query.

In some aspects, the RAG pipeline 300 may include at block 346 assembling the final user query and intent. The final query and intent may be assembled by the query module 128 from the user query, which may be the rephrased user query or the abbreviated user query. Assembling the final user query and intent may include prompt engineering to optimize the final query.

In some aspects, the RAG pipeline 300 may include at block 348 determining whether the intent is to use experts as an information source. The expert determination may be performed by the intent classification module 126 or any other suitable program. If the determination is to query one or more expert collections, then the RAG pipeline 300 may include at block 350 extracting any role, practice, or geographic filters from the final user query. The filters may be extracted by the document/asset/expert module 122 or any other suitable program. The role, practice, or geographic filters may have been explicitly selected by the user at block 320 and appended to the user query. The role, practice, or geographic filters may have been implicitly specified in the text of the user query.

In some aspects, if the intent is to query one or more document collections, the RAG pipeline 300 may include a document collection API 352A. The document collection API 352A may be provided by document/asset/expert module 122 or any other suitable program. The document collection API 352A may enable selection or deselection of one or more specified document collections.

In some aspects, if the intent is to query one or more asset collections, the RAG pipeline 300 may include an asset collection API 352B. The asset collection API 352B may be provided by document/asset/expert module 122 or any other suitable program. The asset collection API 352B may enable selection or deselection of one or more specified asset collections.

In some aspects, if the intent is to query one or more asset collections, the RAG pipeline 300 may include an expert collection API 352C. The expert collection API 352C may be provided by document/asset/expert module 122 or any other suitable program. The expert collection API 352C may enable selection or deselection of one or more specified expert collections.

In some aspects, if the intent is to query one or more document collections, then the RAG pipeline 300 may include at block 354A retrieving the one or more documents from the one or more selected document collections. The documents may be retrieved by the document/asset/expert module 122 or any other suitable program. The retrieved documents may be stored, short term or long term, in document collections 144.

In some aspects, if the intent is to query one or more asset collections then the RAG pipeline 300 may include at block 354B retrieving the one or more assets from the one or more selected asset collections. The assets may be retrieved by the document/asset/expert module 122 or any other suitable program. The retrieved assets may be stored, short term or long term, in asset collections 146.

In some aspects, if the intent is to query one or more expert collections then the RAG pipeline 300 may include at block 354C retrieving the one or more expert biographies from the one or more selected expert collections. The expert biographies may be retrieved by the document/asset/expert module 122 or any other suitable program. The retrieved expert biographies may be stored, short term or long term, in expert collections 148.

In some aspects, the RAG pipeline 300 may include a document specification API 356A. The document specification API 356A may be provided by document/asset/expert module 122 or any other suitable program. The document specification API 356A may enable exclusion of one or more retrieved documents.

In some aspects, the RAG pipeline 300 may include an asset specification API 356B. The asset specification API 356B may be provided by document/asset/expert module 122 or any other suitable program. The asset specification API 356B may enable exclusion of one or more retrieved assets.

In some aspects, the RAG pipeline 300 may include an expert specification API 356C. The expert specification API 356C may be provided by document/asset/expert module 122 or any other suitable program. The expert specification API 356C may enable exclusion of one or more retrieved expert biographies.

Figure 3D:
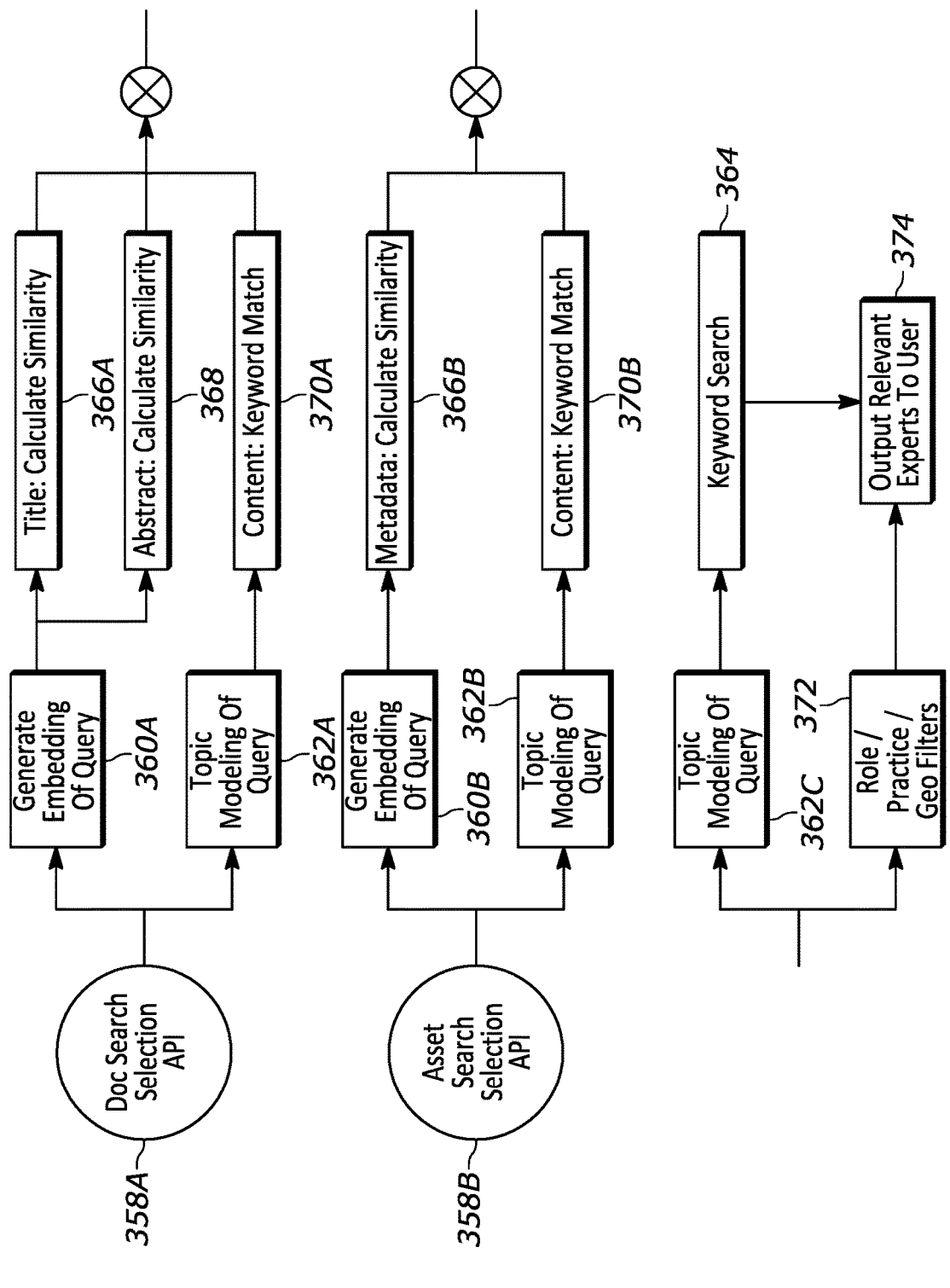

FIG. 3D illustrates an aspect of the RAG pipeline 300 involving selecting and searching the relevant documents, assets, and/or experts. In some aspects, the RAG pipeline 300 may include a document search selection API 358A. The document search selection API 358A may be provided by the relevant information identification module 130 or any other suitable program. The document search selection API 358A may enable selection of one or more document search types, such as a semantic search (e.g., blocks 360A, 366A, and/or 368A) and/or a keyword search (e.g., blocks 362A and/or 370A).

In some aspects, the RAG pipeline 300 may include an asset search selection API 358B. The asset search selection API 358B may be provided by the relevant information identification module 130 or any other suitable program. The asset search selection API 358B may enable selection of one or more asset search types, such as a semantic search (e.g., blocks 360B, 366B, and/or 368B) and/or a keyword search (e.g., blocks 362B and/or 370B).

In some aspects, if the intent is to query one or more document or asset collections then the RAG pipeline 300 may include at blocks 360A and/or 360B generating an embedding of the user query. The user query embedding may be generated by the relevant information identification module 130 or any other suitable program.

In some aspects, the RAG pipeline 300 may include at block 366A and 368 performing a semantic search of the document titles and document abstracts, respectively, from the one or more document collections selected at block 338. The semantic search may be performed by the relevant information identification module 130 or any other suitable program. The semantic search may comprise performing a k-nearest neighbors (KNN) search of the user query embedding and document title and abstract embeddings. The document title and abstract embeddings may be stored in embeddings 168. The semantic search may select one or more documents whose titles and/or abstracts have the highest semantic similarity to the user query.

In some aspects, the RAG pipeline 300 may include at block 366B performing a semantic search of the asset metadata from the one or more asset collections selected at block 338. The semantic search may be performed by the relevant information identification module 130 or any other suitable program. The semantic search may comprise performing a KNN search of the user query embedding and asset metadata embeddings. The asset metadata embeddings may be stored in embeddings 168. The semantic search may select one or more assets whose metadata have the highest semantic similarity to the user query.

In some aspects, the RAG pipeline 300 may include at blocks 362A, 362B, and/or 362C performing topic modeling of the user query. The topic modeling may be performed by the relevant information identification module 130 or any other suitable program. The topic modeling may generate one or more topic keywords from the user query.

In some aspects, the RAG pipeline 300 may include at blocks 370A and/or 370B performing a keyword search of the retrieved documents and/or retrieved assets using the topic keywords. The keyword search may be performed by the relevant information identification module 130 or any other suitable program. The keyword search may select one or more documents or assets that include one or more topic keywords.

In some aspects, the RAG pipeline 300 may include at block 364 performing a keyword search of the retrieved expert biographies using the topic keywords. The keyword search may be performed by the relevant information identification module 130 or any other suitable program. The keyword search may select one or more expert biographies that include one or more topic keywords.

In some aspects, the RAG pipeline 300 may include at block 372 applying the role, practice, and geographic filters identified at block 350. The filters may be applied by the relevant information identification module 130 or any other suitable program. Applying the filters may include deselecting one or more expert biographies selected at block 364 that do not match one or more of the role, practice, or geographic filters.

In some aspects, the RAG pipeline 300 may include at block 374 outputting the relevant experts to the user. The relevant experts may be outputted by the input/output module 120 or any other suitable program. The relevant expert output may include names, contact information, and/or links to, copies of, or summaries of the expert biographies. In some aspects, the relevant experts may be used as input to further identify relevant documents or assets to respond to a user query, as discussed elsewhere herein.

Figure 3E:
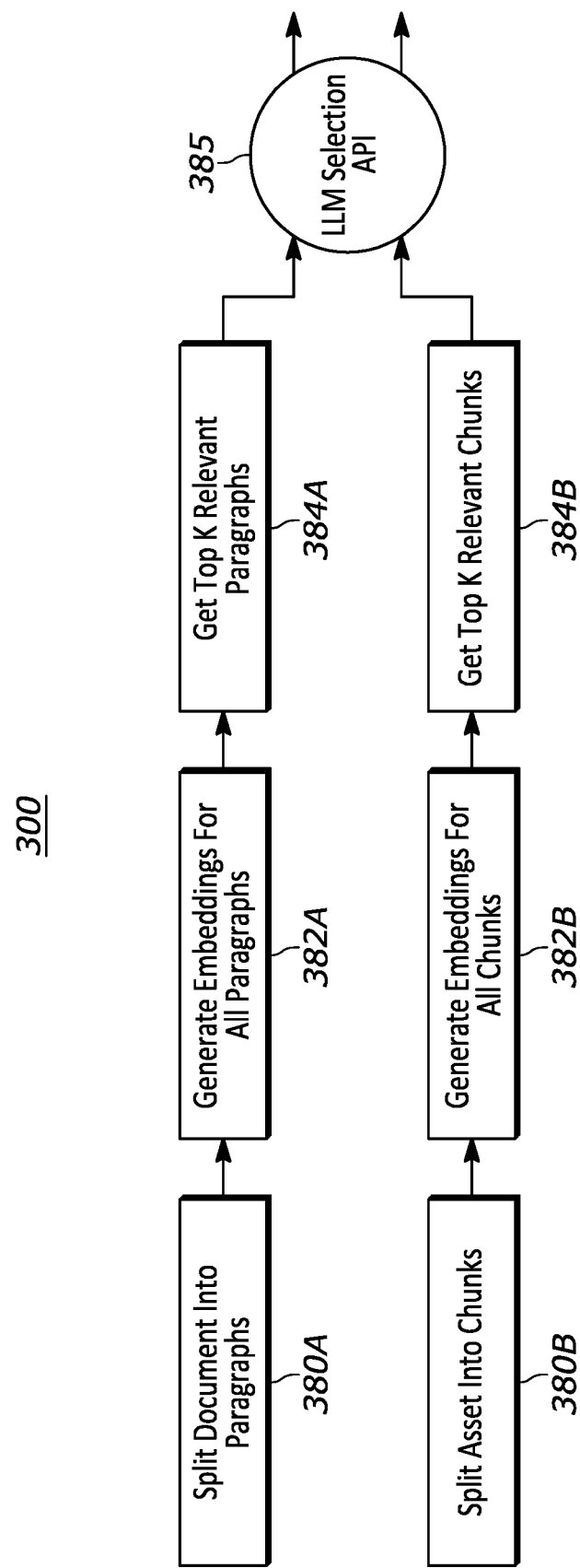

FIG. 3E illustrates an aspect of the RAG pipeline 300 involving splitting documents or assets into text or data chunks and determining the most relevant text or data chunks. In some aspects, the RAG pipeline 300 may include at block 380A splitting each selected document into a plurality of text chunks and/or splitting each selected asset into a plurality of data chunks at block 380B. The selected documents and/or selected assets may be split by the document/asset/expert module 122 or any other suitable program.

In some aspects, the RAG pipeline 300 may include at block 382A generating an embedding for each text chunk and/or generating an embedding for each data chunk at block 382B. The embeddings may be generated by the document/asset/expert module 122 or any other suitable program. The text chunks and data chunks may be sent to an AI model, such as the LLM service 170, to cause the AI model to generate the embeddings. The generated embeddings may be stored in embeddings 168.

In some aspects, the RAG pipeline 300 may include at block 384A identifying the top relevant text chunks and/or identifying the top relevant data chunks at block 384B. The top relevant text chunks and/or data chunks may be identified by the relevant information identification module 130 or any other suitable program. The top relevant text and data chunks may be identified by a semantic search. The semantic search may comprise performing a KNN search of the user query embedding and text chunk and/or data chunk embeddings.

In some aspects, the RAG pipeline 300 may include may include an LLM selection API 385. The LLM selection API 385 may be provided by the LLM interface module 132 or any other suitable program. The LLM selection API 385 may enable selection of which LLM to use, such as LLM service 170. The LLM selection API 385 may automatically determine which LLM to use based upon the most relevant text or data chunks or from the user query.

Figure 3F:
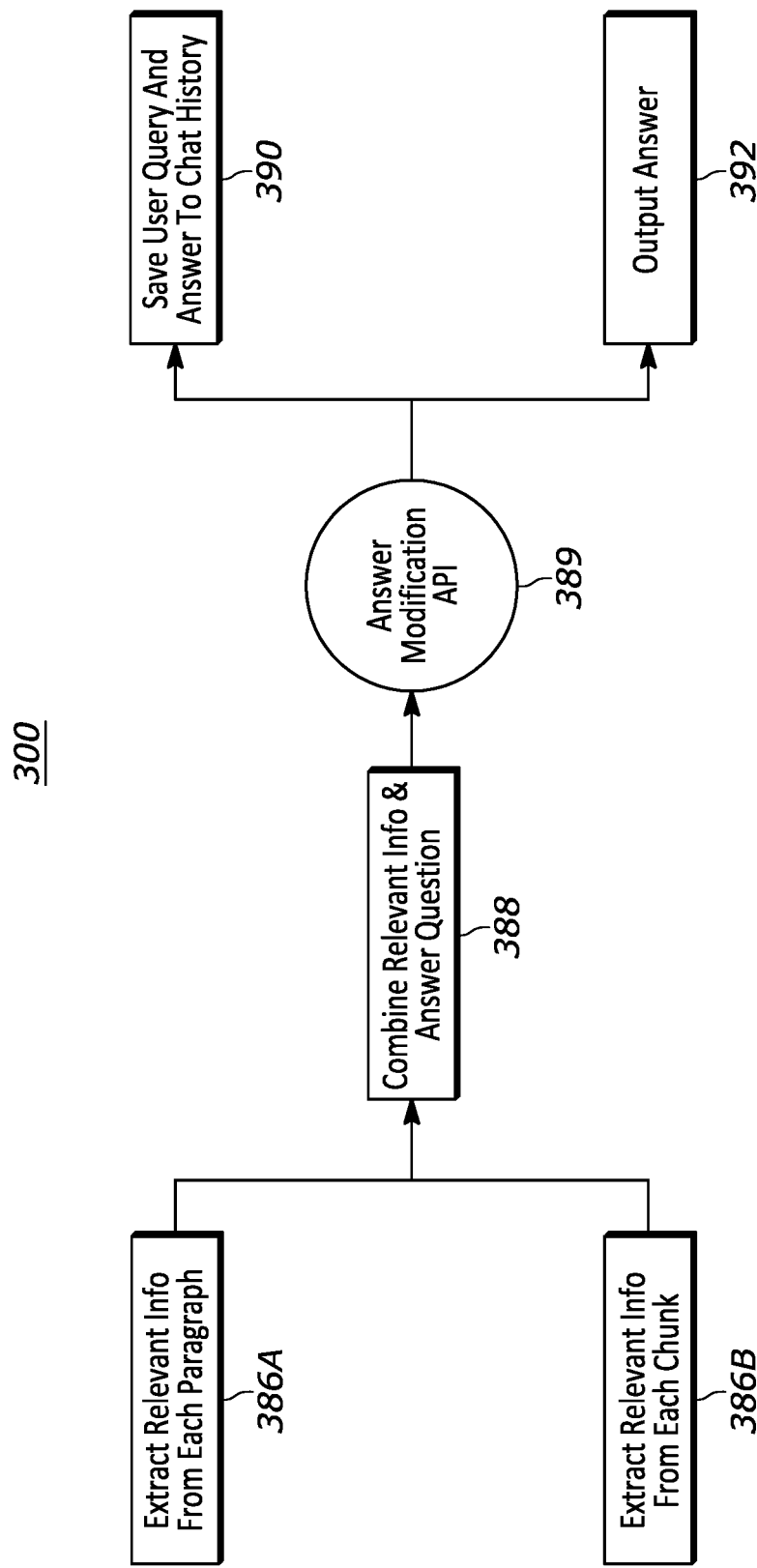

FIG. 3F illustrates an aspect of the RAG pipeline 300 involving querying one or more LLM services 170 based upon the most relevant text chunks and combining the responses into an answer to the user query. In some aspects, the RAG pipeline 300 may include at block 386A extracting relevant information from each of the top relevant text chunks and/or extracting relevant information from each of the top relevant data chunks at block 386B. The relevant information may be extracted by the LLM interface module 132, LLM service 170, and/or any other suitable program or service. The LLM interface module 132 may submit a prompt to the LLM service 170 comprising the user query, the top relevant text chunks and data chunks, and a request for the LLM to extract information from the text chunks and data chunks that is relevant to the user query. The prompt may include citation information, e.g., document name, page number, asset name, etc., for each text chunk or data chunk and a request for the LLM to include the citation information in the output. In some aspects, a plurality of prompts may be submitted to the LLM service 170 comprising one or more of the text chunks and data chunks. In some aspects, the plurality of prompts may be submitted to the LLM service 170 in parallel. The one or more prompts may cause the LLM service 170 to output relevant information for each of the text chunks and data chunks.

In some aspects, the RAG pipeline 300 may include at block 388 combining the relevant information and answering the user query. Combining the relevant information and answering the user query may be performed by the LLM interface module 132, LLM service 170, and/or any other suitable program or service. The LLM interface module 132 may submit a prompt to the LLM service 170 comprising the user query, all of the relevant information output by blocks 386A and 386B, and a request for the LLM to answer the user query using the provided relevant information. The prompt may include the citation information for the relevant information and a request for the answer to include the citation information. The prompt may cause the LLM service 170 to output an answer. The answer may include one or more citations.

In some aspects, the RAG pipeline 300 may include an answer modification API 389. The answer modification API 389 may be provided by the input/output module 120 or any other suitable program. The answer modification API 389 may enable addition, deletion, or modification of answer text.

In some aspects, the RAG pipeline 300 may include at block 390 saving the user query and answer to the chat history. The user query and answer may be saved by the chat history module 124 or any other suitable program. The user query and answer may be saved to the chat history 142. The chat ID may be saved along with the user query and answer.

In some aspects, the RAG pipeline 300 may include at block 392 outputting the answer. The answer may be output by the input/output module 120 or any other suitable program. The answer may be output to the user or may be provided as input to another generative AI pipeline, such as RAG pipeline 300.

It should be understood that not all blocks of the exemplary RAG pipeline 300 are required to be performed. Moreover, the exemplary RAG pipeline 300 is not mutually exclusive (i.e., block(s) from exemplary RAG pipeline 300 may be performed in any particular implementation).

Exemplary Packaged RAG Pipeline Providing APIs for Customizability

Figure 4:
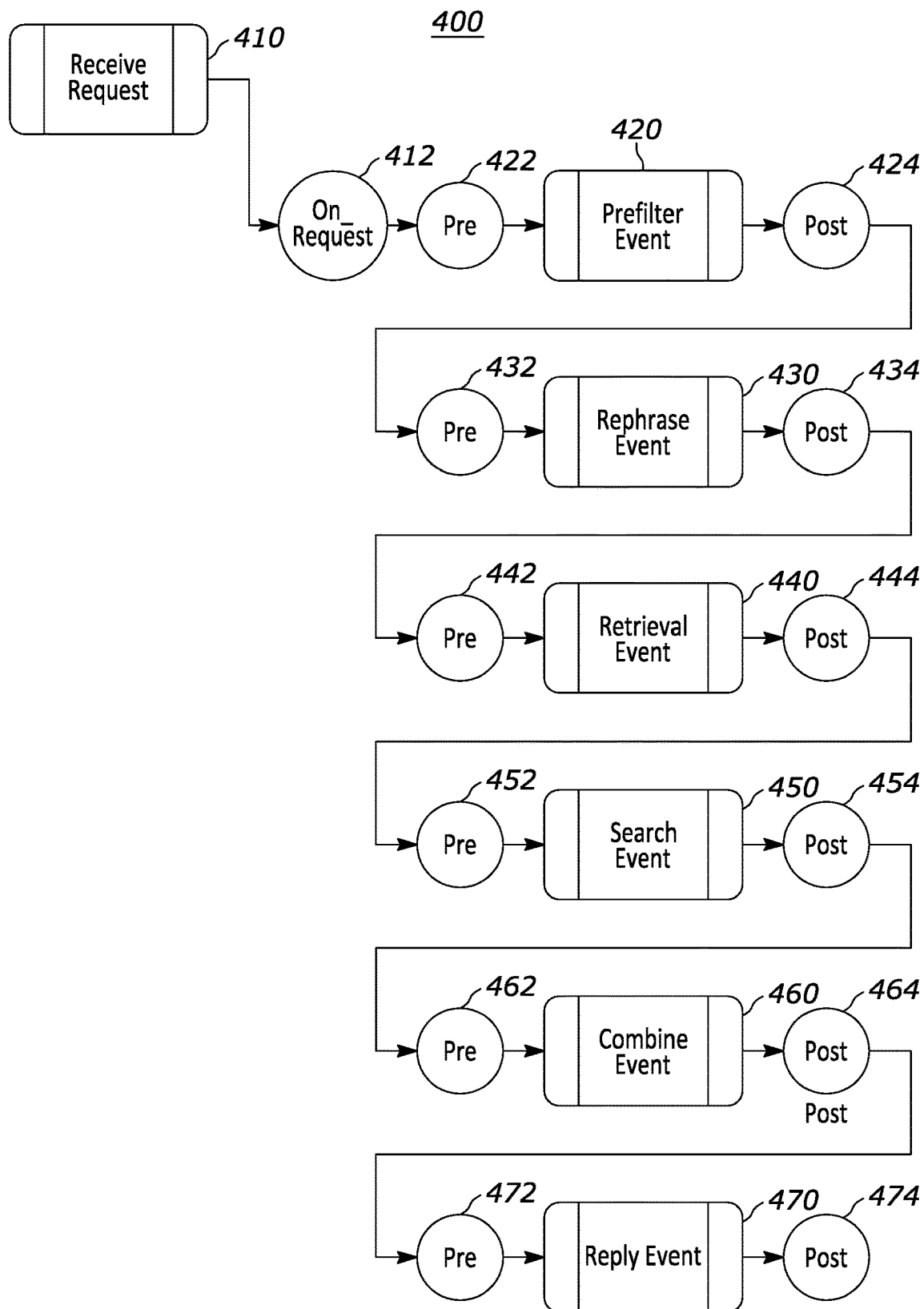
FIG. 4 depicts an exemplary RAG pipeline providing APIs for customizability, according to some aspects.

FIG. 4 depicts an exemplary packaged RAG pipeline 400 including APIs for customizability. The packaged RAG pipeline 400 may comprise interpreted code, source code, and/or pre-compiled executables and libraries configured to execute on a computing system, such as server 110. The packaged RAG pipeline 400 may be configured to be deployed by organizations without requiring any modification or reprogramming of any source code of the packaged RAG pipeline 400. The packaged RAG pipeline 400 may be customized with configuration settings to enable operation of the packaged RAG pipeline 400 for an organization. For example, configuration settings may specify identities, credentials, and other settings for the packaged RAG pipeline to interface with the internal data store 140, external data sources 160, and LLM service 170. The configuration settings may specify one or more documents, document collections, assets, or asset collections from the document collections 162, document collections 144, asset collections 164, and asset collection 146 to include or exclude from search and retrieval.

In some aspects, the packaged RAG pipeline 400 may include one or more pre-built code blocks that are configured to perform steps of RAG queries. The pre-built code blocks may include a receive request code block 410, a prefilter event code block 420, a rephrase event code block 430, a retrieval event code block 440, a search event code block 450, a combine event code block 460, and a reply event code block 470. The receive request code block 410 may include some or all of the functionality of the input/output module 120, including receiving user queries. The prefilter event code block 420 and the rephrase event code block 430 may include some or all of the functionality of the query module 128, including rephrasing user queries into canonical form and incorporating chat history. The retrieval event code block 440 may include some or all of the functionality of the document/asset/expert module 122, including retrieving relevant documents and/or assets. The search event code block 450 may include some or all of the functionality of the relevant information identification module 130, including searching the documents and/or assets for relevant information. The combine event code block 460 may include some or all of the functionality of the LLM interface module 132, including sending the relevant information to the LLM service 170 and receiving an answer. The reply event code block 470 may include some or all of the functionality of the input/output module 120, including sending the answer to the user or to a generative AI pipeline.

In some aspects, the packaged RAG pipeline 400 may include one or more APIs. The APIs may enable the packaged RAG pipeline 400 to execute custom code plug-ins. The APIs may enable modification of code block input data, code block output data, or behaviors of the code blocks themselves. The APIs may include an on-request API 412, a pre-prefilter API 422, a post-prefilter API 424, a pre-rephrase API 432, an post-rephrase API 434, a pre-retrieval API 442, a post-retrieval API 444, a pre-search API 452, a post-search API 454, a pre-combine API 462, a post-combine API 464, a pre-reply API 472, and a post-reply API 474.

Exemplary Parallel Data Flow for LLM Queries

Figure 5:
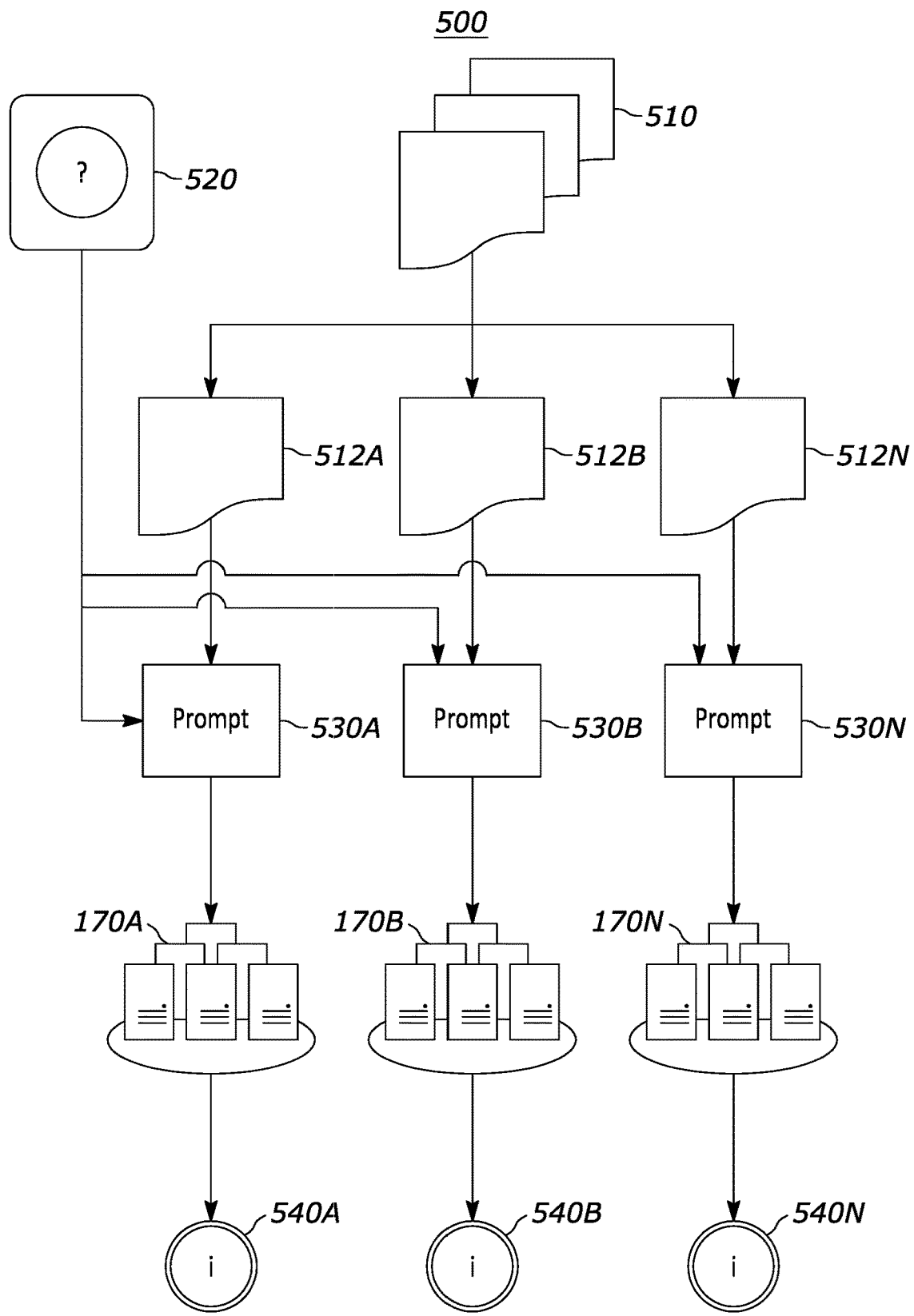
FIG. 5 depicts an exemplary data flow for parallelization of LLM queries, according to some aspects.

FIG. 5 depicts an exemplary parallel data flow 500 for LLM queries in a RAG pipeline. The parallel data flow 500 may be implemented by the computing environment 100, including the server 110, internal data store 140, external data sources 160, and LLM service 170. The parallel data flow 500 may include one or more steps of the RAG pipeline 300, including blocks 384A, 384B, 386A, and 386B.

In some aspects, the parallel data flow 500 may include receiving or identifying the top relevant text/data chunk set 510. The top relevant text/data chunk set 510 may be identified by the relevant information identification module 130 or any other suitable program and may be identified at blocks 384A and/or 384B of RAG pipeline 300. The top relevant text/data chunk set 510 may include a plurality of text chunks and/or a plurality of data chunks.

In some aspects, the parallel data flow 500 may include splitting the top relevant text/data chunk set 510 into relevant text/data chunks 512A-512N. The relevant text/data chunks 512A-512N may be split by the relevant information identification module 130 or any other suitable program and may be split at blocks 380A and/or 380B of RAG pipeline 300. The relevant text/data chunks 512A-512N may each include a single text chunk or data chunk. Although three relevant text/data chunks 512A-512N are depicted, any number of text/data chunks may be present.

In some aspects, the parallel data flow 500 may include generating prompts 530A-530N that combine each relevant text/data chunk 512A-512N with the user query 520 to generate a prompt for each relevant text/data chunk 512A-512N. The prompts 530A-530N may be generated by the query module 128 or any other suitable program. The prompts 530A-530N may include instructions to extract information relevant to the user query 520 from the included relevant text/data chunks 512A-512N.

In some aspects, the parallel data flow 500 may include concurrently submitting a plurality or all of the prompts 530A-530N to one or more LLM services 170A-170N. The prompts 530A-530N may be submitted by the LLM interface module 132 or any other suitable program and submission may occur at blocks 386A and/or 386B of RAG pipeline 300. The prompts 530A-530N may be concurrently submitted to the LLM services 170A-170N at or around the same time without waiting for an answer to any previously submitted prompt, thus effectively parallelizing the query process by breaking the user query into a plurality of more limited queries. The prompts 530A-530N may be distributed among a plurality of LLM services 170A-170N by the load balancer 190.

In some aspects, the parallel data flow 500 may include receiving relevant information outputs 540A-540N from the LLM service 170. The relevant information outputs 540A-540N may be received by the LLM interface module 132 or any other suitable program and receipt may occur at blocks 386A and/or 386B of RAG pipeline 300. A relevant information output 540A-540N may be received for each prompt 530A-530N submitted to the LLM service 170. The relevant information outputs 540A-540N may then be combined into an answer to the user query, as discussed elsewhere herein.

Exemplary Packaged Customizable RAG Pipeline Method

Figure 6A:
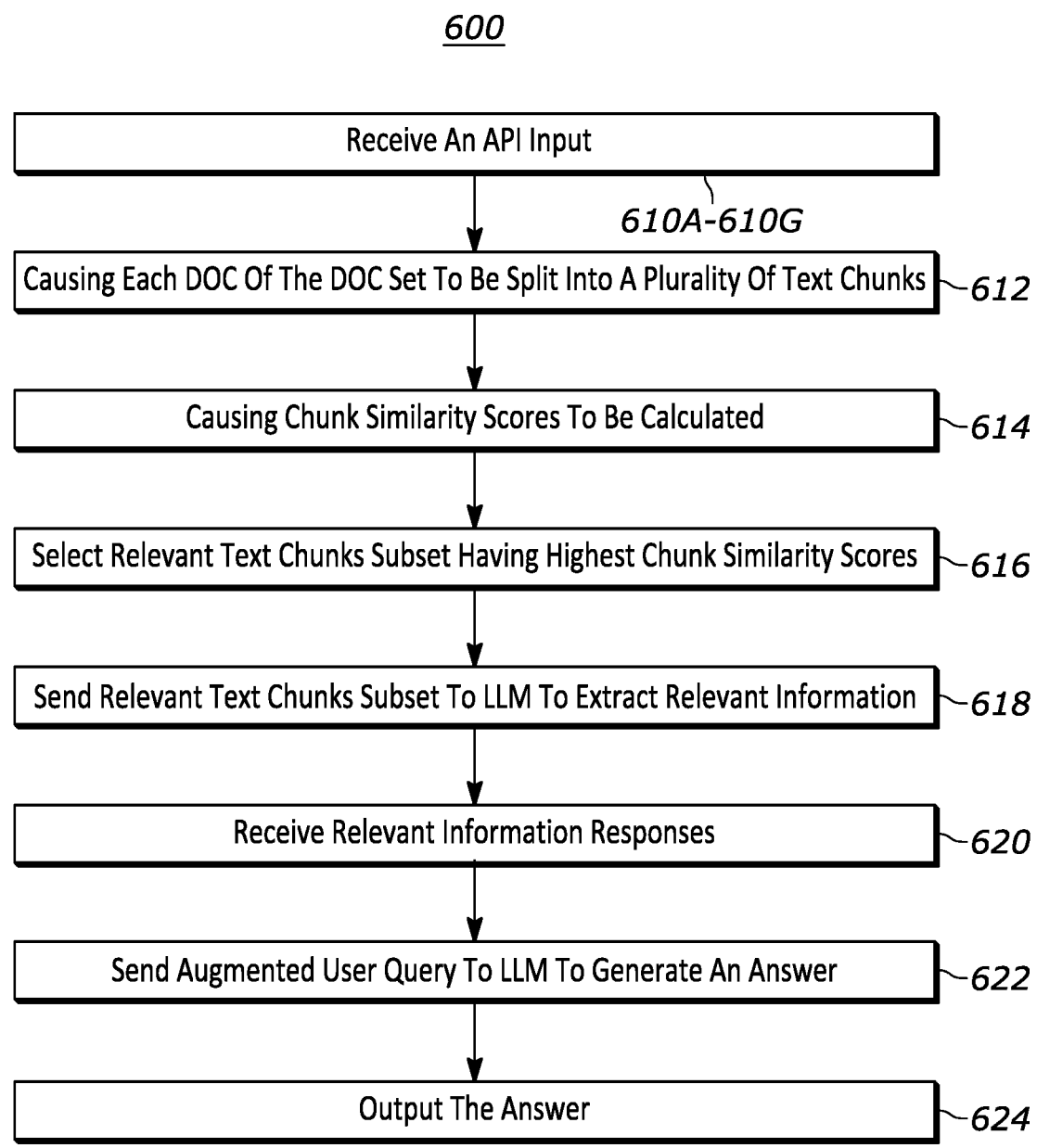
FIGS. 6A-6C depict exemplary flow diagrams of a method for performing LLM queries using a packaged customizable RAG pipeline, according to some aspects.
Figure 6B:
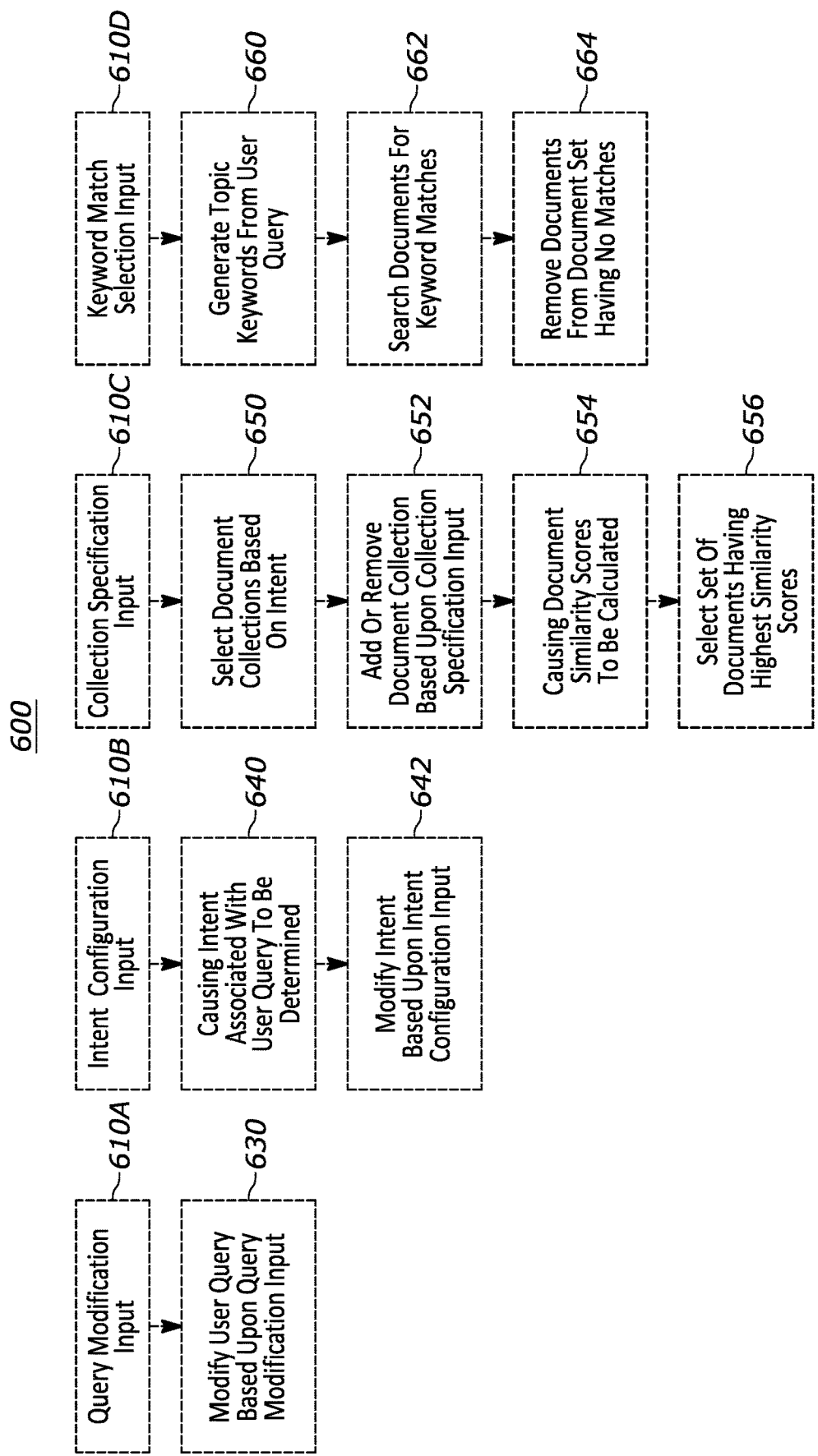
Figure 6C:
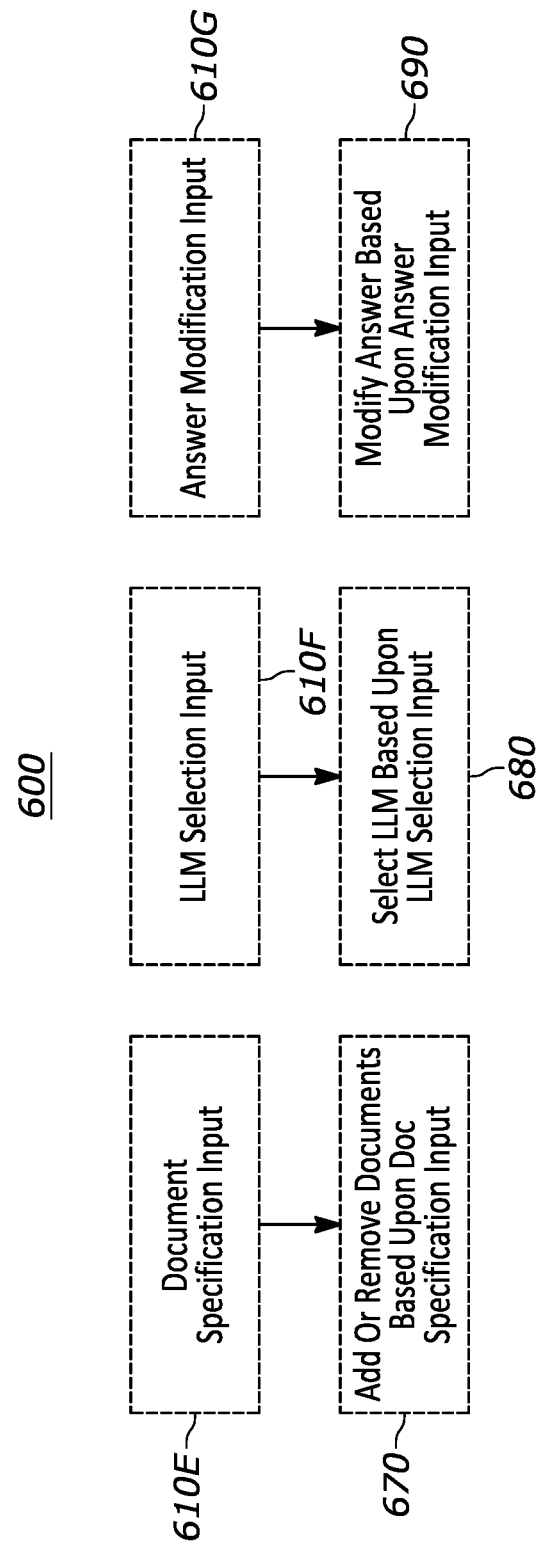

FIGS. 6A-6C depict flow diagrams of an exemplary computer-implemented method 600 for answering LLM queries using a packaged customizable RAG pipeline. One or more steps of the computer-implemented method 600 may be implemented as a set of instructions stored on a computer-readable memory and executable on one or more processors. The computer-implemented method 600 of FIGS. 6A-6C may be implemented via a system, such as the server 110, the internal data store 140, the external data sources 160, the LLM service 170, and/or the user device 180. The computer-implemented method 600 may operate in conjunction with the scenarios and/or environments illustrated in FIGS. 1-5 and/or in other environments.

FIG. 6A illustrates an aspect of the computer-implemented method 600 involving receiving an API input and performing steps of the RAG pipeline. The computer-implemented method 600 may include at blocks 610A-610G receiving an API input. The received API input may include a query modification input at block 610A, an intent configuration input at block 610B, a document collection specification input at block 610C, a keyword match selection input at block 610D, a document specification input at block 610E, an LLM selection input at block 610F, and/or an answer modification input at block 610G.

The computer-implemented method 600 may continue at block 612 by causing each document of the document set to be split into a plurality of text chunks. The documents may be split by the document/asset/expert module 122 or the LLM service 170. Splitting the documents may be performed at block 380A of the RAG pipeline 300.

The computer-implemented method 600 may continue at block 614 by causing chunk similarity scores to be calculated. The chunk similarity scores may be calculated by the relevant information identification module 130 or the LLM service 170. Chunk similarity scores may be calculated at blocks 382A and/or 384A of the RAG pipeline 300. Chunk similarity scores may indicate semantic similarity of the user query to each text chunk of the plurality of documents. The chunk similarity scores may be calculated using various techniques, such as cosine similarity between the vectors representing the chunks.

The computer-implemented method 600 may continue at block 616 by selecting a relevant text chunks subset having the highest chunk similarity scores. The text chunks may be selected by the relevant information identification module 130. Selection of the text chunks having the highest similarity scores may be performed at block 384A of the RAG pipeline 300.

The computer-implemented method 600 may continue at block 618 by, for each text chunk in the relevant text chunks subset, sending an augmented text chunk to cause the LLM to extract relevant information from the text chunk. The augmented text chunks may be sent by the LLM interface module 132. Sending the augmented text chunks may occur at block 386A of the RAG pipeline 300. The augmented text chunks may include the text chunk, the user query, and an extraction prompt.

The computer-implemented method 600 may continue at block 620 by receiving relevant information responses for the augmented text chunks. The relevant information responses may be received by the LLM interface module 132. Receiving the relevant information responses may occur at block 386A of the RAG pipeline 300. The relevant information responses may include the relevant information extracted from each text chunk.

The computer-implemented method 600 may continue at block 622 by sending an augmented user query to an LLM to cause the LLM to obtain an answer from the LLM, such as an LLM service 170. The augmented user query may be sent by the LLM interface module 132. Sending the augmented user query may occur at block 388 of the RAG pipeline 300. The augmented user query may include the relevant information responses, the user query, and a prompt to cause the LLM to generate an answer.

The computer-implemented method 600 may conclude at block 624 by outputting the answer. The answer may be output by the input/output module 120. Outputting the answer may occur at block 392 of the RAG pipeline 300. The answer may be output to the user device that submitted the query or to the same or another RAG pipeline for use as an input (e.g., a query initiating a next stage of analysis).

FIG. 6B illustrates aspects of the computer-implemented method 600 involving steps performed when specified API inputs are received.

In one aspect, the computer-implemented method 600 may include receiving a query modification input at block 610A. The query modification input may be received by the query modification API 345 of the RAG pipeline 300. The computer-implemented method 600 may include at block 630 modifying the user query in response to receiving the query modification input. The query may be modified by the query module 128.

In one aspect, the computer-implemented method 600 may include receiving an intent configuration input 610B. The intent configuration input may be received by the intent modification API 335 of the RAG pipeline 300. The computer-implemented method may include at block 640 causing an intent associated with the user query to be determined. The intent may be determined by the intent classification module 126 or by the LLM service 170. Intent determination may be performed at block 332 of the RAG pipeline 300. The computer-implemented method 600 may include at block 642 modifying the intent in response to receiving the intent configuration input. The intent may be modified by the intent classification module 126.

In one aspect, the computer-implemented method 600 may include receiving a collection specification input at block 610C. The collection specification input may be received by the document collection API 352A. The computer-implemented method 600 may include at block 650 selecting one or more document collections based on the intent. The document collections may be selected by the document/asset/expert module 122. Selecting the document collections may be performed by block 338 of the RAG pipeline 300. The computer-implemented method 600 may include at block 652 adding or removing a document collection from the one or more selected document collections based upon receiving a collection specification input. The document collection may be added or removed by the document/asset/expert module 122. In one aspect, the computer-implemented method 600 may include at block 654 causing document similarity scores for each document of the document collections to be calculated. The document similarity scores may be calculated by the relevant information identification module 130 or the LLM service 170. Calculating the document similarity scores may be performed at blocks 366A and/or 368A of the RAG pipeline 300. Calculating the document similarity scores may include determining the semantic similarity of the user query to each document. Determining the semantic similarity may include comparing an embedding of the user query to an embedding of the document title and/or an embedding of the document abstract. The computer-implemented method 600 may include at block 656 selecting a document set including the one or more documents having the highest document similarity scores. The document set may be selected by the relevant information identification module 130. Selecting the document set may be performed at blocks 366A and/or 368A of the RAG pipeline 300.

In one aspect, the computer-implemented method 600 may include receiving a keyword match selection input at block 610D. The keyword match selection input may be received by the document search selection API 358A of the RAG pipeline 300. The computer-implemented method 600 may include at block 660 generating one or more topic keywords from the user query. The topic keywords may be generated by the relevant information identification module 130. Generation of topic keywords may be performed at block 362A of the RAG pipeline 300. The computer-implemented method 600 may include at block 662 searching each document of the document set with the one or more topic keywords for keyword matches. The documents may be searched by the relevant information identification module 130. Searching the documents with the one or more topic keywords may be performed at block 370A of the RAG pipeline 300. The computer-implemented method 600 may include at block 664 removing the documents from the document set having no keyword matches. Documents may be removed from the document set by the relevant information identification module 130. Removing the documents from the document set may be performed at block 370A of the RAG pipeline 300.

FIG. 6C further illustrates aspects of the computer-implemented method 600 involving steps performed when specified API inputs are received.

In one aspect, the computer-implemented method 600 may include receiving a document specification input at block 610E. The document specification input may be received by the doc collection API 352A of the RAG pipeline 300. The computer-implemented method 600 may include at block 670 adding or removing documents from a document set in response to the document specification input. The documents may be added or removed from the document set by the document/asset/expert module 122.

In one aspect, the computer-implemented method 600 may include receiving an LLM selection input at block 610F. The LLM selection input may be received by the LLM selection API at block 385 of the RAG pipeline 300. The computer-implemented method 600 may include at block 680 selecting an LLM from a plurality of LLMs based on the LLM selection input.

In one aspect, the computer-implemented method 600 may include receiving an answer modification input at block 610G. The answer modification input may be received by the answer modification API 389 of the RAG pipeline 300. The computer implemented method may include at block 690 modifying the answer based upon the answer modification input. For example, multiple answers from the LLM in response to multiple augmented user queries may be combined into a single answer. The answer may be modified by the input/output module 120.

It should be understood that not all blocks of the computer-implemented method 600 are required to be performed. Moreover, the computer-implemented method 600 is not mutually exclusive (i.e., block(s) from computer-implemented method 600 may be performed in any particular implementation).

Exemplary Method of Parallelizing LLM Queries in a RAG Pipeline

Figure 7A:
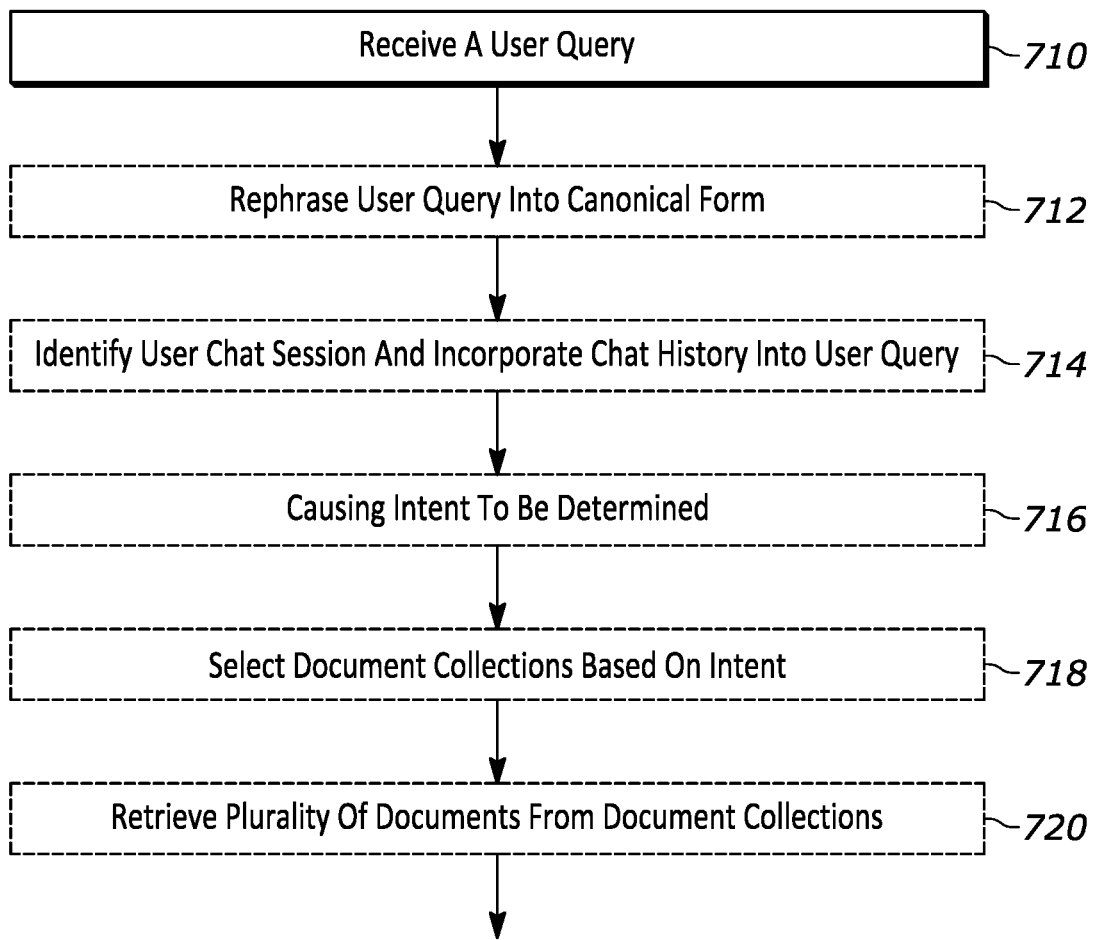
FIGS. 7A-7C depict exemplary flow diagrams of a method for parallelizing LLM queries in a RAG pipeline, according to some aspects.
Figure 7B:
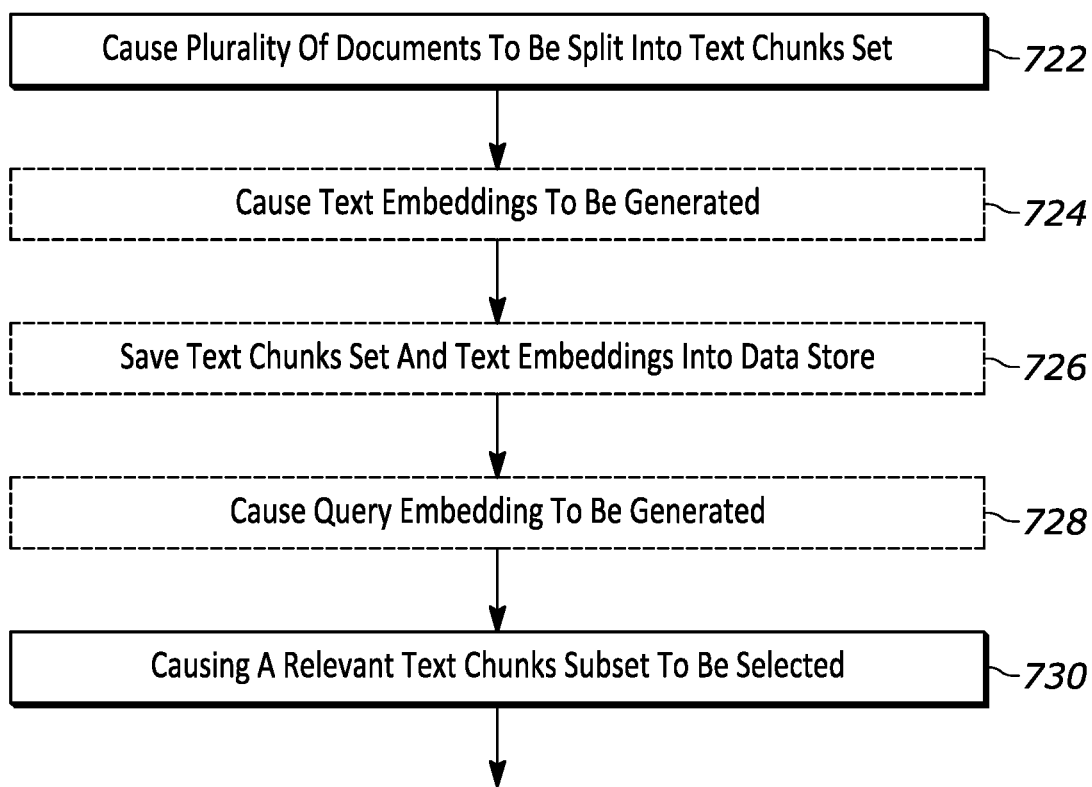
Figure 7C:
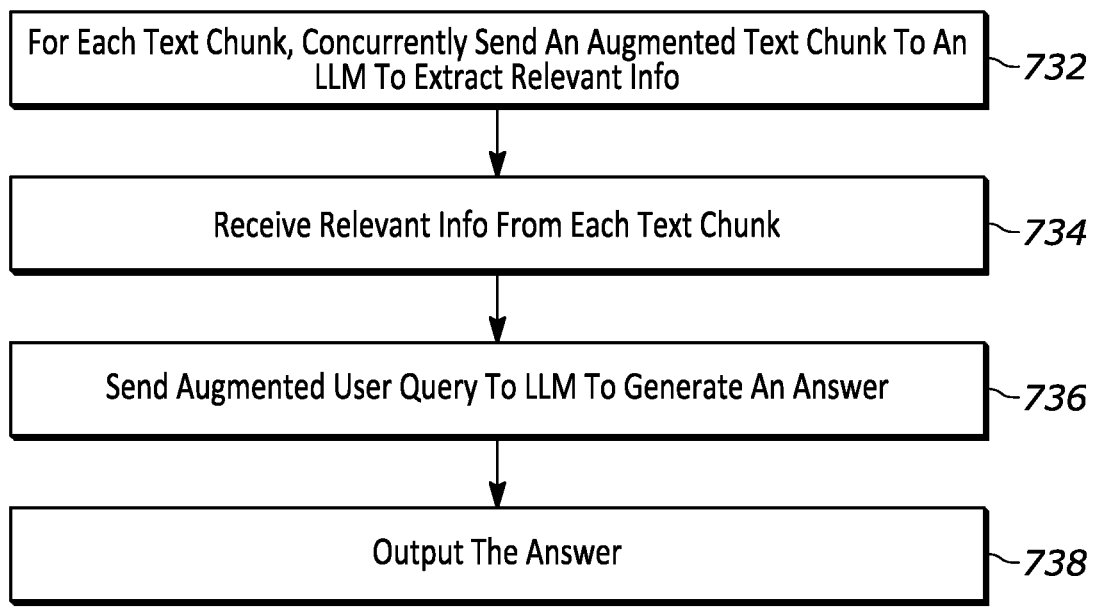

FIGS. 7A-7C depict flow diagrams of an exemplary computer-implemented method 700 for parallelizing LLM queries in a RAG pipeline. One or more steps of the computer-implemented method 700 may be implemented as a set of instructions stored on a computer-readable memory and executable on one or more processors. The computer-implemented method 700 of FIGS. 7A-7C may be implemented via a system, such as the server 110, the internal data store 140, the external data sources 160, the LLM service 170, and/or the user device 180. The computer-implemented method 700 may operate in conjunction with the scenarios and/or environments illustrated in FIGS. 1-6C and/or in other environments.

FIG. 7A illustrates aspects of the computer-implemented method 700 involving receiving a user query, incorporating a chat history, determining an intent, and retrieving documents. The computer-implemented method 700 may include at block 710 receiving a user query. The user query may be received by the input/output module 120. The user query may be received from the user or from a generative AI pipeline.

In some aspects, the computer-implemented method 700 may include at block 712 rephrasing the user query into a canonical form. Rephrasing the user query may be performed by the query module 128. The user query may be rephrased at block 322 of the RAG pipeline. Rephrasing into a canonical form may include expanding acronyms, assigning a persona to the LLM, inserting text delimiters, requesting structured output, replacing one or more words of the user query with synonyms, replacing jargon with standard terminology, etc.

In some aspects, the computer-implemented method 700 may include at block 714 identifying a user chat session associated with the user query in order to determine context for the user query. The user chat session may be identified by the chat history module 124. The existence of the user chat session may be determined at block 324 of the RAG pipeline 300. A chat history associated with the user chat session may be fetched at block 328 of the RAG pipeline 300. The computer-implemented method 700 may include incorporating text from the chat history into the user query. Text from the chat history may be incorporated into the user query at block 342 of the RAG pipeline.

In some aspects, the computer-implemented method 700 may include at block 716 causing an intent associated with the query to be determined. The intent may be determined by intent classification module 126 or the LLM service 170. The intent may be determined at block 332 of the RAG pipeline 300.

In some aspects, the computer-implemented method 700 may include at block 718 selecting, based on the intent, one or more document collections from a plurality of document collections. The document collections may be selected by the document/asset/expert module 122. The document collections selection may be performed at block 338 of the RAG pipeline 300.

In some aspects, the computer-implemented method 700 may include at block 720 retrieving a plurality of documents from the one or more document collections. The plurality of documents may be retrieved by the document/asset/expert module 122. The plurality of documents may be retrieved at block 352 of the RAG pipeline 300.

FIG. 7B illustrates aspects of the computer-implemented method 700 involving splitting documents into text chunks, selecting relevant text chunks, and concurrently sending augmented text chunks to an LLM to extract relevant information. In some aspects, the computer-implemented method 700 may include at block 722 causing the plurality of documents to be split into a text chunks set. The plurality of documents may be split by the document/asset/expert module 122 or the LLM service 170. Splitting the plurality of documents may be performed at block 380A of the RAG pipeline 300.

In some aspects, the computer-implemented method 700 may include at block 724 causing text embeddings to be generated from the text chunks. Causing the text embeddings to be generated may be performed by the relevant information identification module 130 or the LLM service 170. The text embeddings may be generated at block 382A of the RAG pipeline 300.

In some aspects, the computer-implemented method 700 may include at block 726 saving the text chunks set and text embeddings into a data store. The text chunks set and text embeddings may be saved by the document/asset/expert module 122. The text chunks set and text embeddings may be saved at block 382A of the RAG pipeline 300. The text chunks set and text embeddings may be saved into internal data store 140.

In some aspects, the computer-implemented method 700 may include at block 728 causing a query embedding to be generated from the user query. Causing the query embedding to be generated may be performed by the relevant information identification module 130 or the LLM service. The query embedding may be generated at block 360A of the RAG pipeline 300.

The computer-implemented method 700 may include at block 730 causing a relevant text chunks subset to be selected. The relevant text chunks subset may be selected by the relevant information identification module 130 or the LLM service 170. The relevant text chunks may be selected by the identifying the top relevant text chunks block 384A performed in the RAG pipeline 300. The relevant text chunks subset may be selected based upon the semantic similarity to the user query.

The computer-implemented method 700 may include at block 732, for each text chunk in the relevant text chunks subset, concurrently sending an augmented text chunk to an LLM to extract relevant information. A plurality of the augmented text chunks may be concurrently sent by the LLM interface module 132. The augmented text chunks may include the prompts 530A-530N. The augmented text chunks may include the text chunk, the user query, and an extraction prompt. The LLM may include one or more of the LLM services 170.

FIG. 7C illustrates aspects of the computer-implemented method 700 involving sending an augmented user query that includes relevant to an LLM to generate an answer. The computer-implemented method 700 may include at block 734 receiving relevant information responses from each text chunk. The relevant information responses may be received from the LLM service 170 by the LLM interface module 132. The relevant information responses may include the relevant information outputs 540A-540N. The relevant information responses may include the relevant information extracted from the text chunks.

The computer-implemented method 700 may include at block 736 sending an augmented user query to the LLM to generate an answer. The augmented user query may be sent to the LLM service 170 and an answer may be received from the LLM service 170 by the LLM interface module 132. The augmented user query may be generated and sent by the combining the relevant information and answering the user query block 388 of the RAG pipeline 300. The augmented user query may include each of the relevant information responses, the user query, and a prompt causing the LLM to generate an answer. The prompt may cause the LLM to generate the answer by combining each of the plurality of relevant information responses into a relevant response block and summarizing the relevant response block into an answer.

The computer-implemented method 700 may conclude at block 738 by outputting the answer. The answer may be output by the input/output module 120. Outputting the answer may occur at block 392 of the RAG pipeline 300. The answer may be output to the user device that submitted the query or to the same or another generative AI pipeline for use as an input (e.g., a query initiating a next stage of analysis).

It should be understood that not all blocks of the computer-implemented method 700 are required to be performed. Moreover, the computer-implemented method 700 is not mutually exclusive (i.e., block(s) from computer-implemented method 700 may be performed in any particular implementation).

Exemplary Method of Using a RAG Pipeline With Decentralized Data Sources

Figure 8:
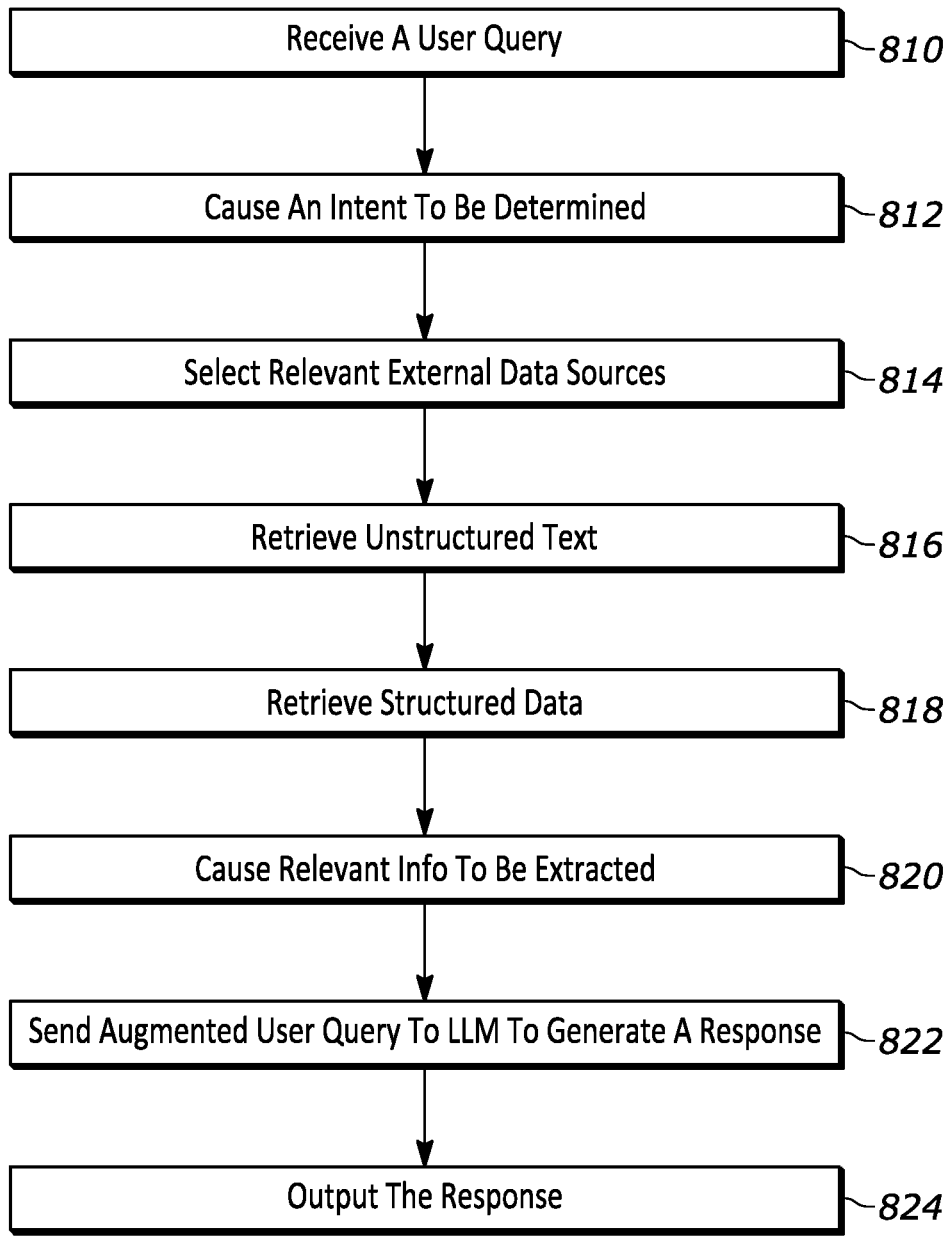
FIG. 8 depicts an exemplary flow diagram of a method for performing LLM queries using a packaged RAG pipeline with decentralized data sources, according to some aspects.

FIG. 8 depicts a flow diagram of an exemplary computer-implemented method 800 for performing LLM queries using a packaged RAG pipeline with decentralized data sources. One or more steps of the computer-implemented method 800 may be implemented as a set of instructions stored on a computer-readable memory and executable on one or more processors. The computer-implemented method 800 of FIG. 8 may be implemented via a system, such as the server 110, the internal data store 140, the external data sources 160, the LLM service 170, and/or the user device 180. The computer-implemented method 800 may operate in conjunction with the scenarios and/or environments illustrated in FIGS. 1-7C and/or in other environments.

The computer-implemented method 800 may include at block 810 receiving a user query. The user query may be received by the input/output module 120. The user query may be received from the user or from another generative AI pipeline.

The computer-implemented method 800 may include at block 812 causing an intent associated with the user query to be determined. The intent may be determined by the intent classification module 126 or by the LLM service 170. In some aspects, the intent may be determined from a plurality of predetermined intents based upon the user query and a context based upon a session history associated with the user. In some aspects, the intent may comprise one or more keywords.

The computer-implemented method 800 may include at block 814 selecting one or more relevant external data sources from a plurality of external data sources. The selection may be based on a comparison of the intent with external data source metadata. The external data source metadata may describe information available from the plurality of external data sources. The relevant external data sources may be selected by the document/asset/expert module 122 or by the LLM service 170. In some aspects, the selection may include searching for the one or more keywords in the external data source metadata. In some aspects, the selection may include selecting the external data sources having the highest semantic similarity to the intent.

The computer-implemented method 800 may include at block 816 retrieving unstructured text from at least one of the relevant external data sources. The unstructured text may be retrieved by the document/asset/expert module 122. In some aspects, retrieving unstructured text may include scraping text from one or more web pages.

The computer-implemented method 800 may include at block 818 retrieving structured data from at least one of the relevant external data sources. The structured data may be retrieved by the document/asset/expert module 122. In some aspects, retrieving structured data includes querying one or more relational databases, non-relational databases (e.g., NoSQL), and/or knowledge graphs.

The computer-implemented method 800 may include at block 820 causing relevant information from the unstructured text and the structured data to be extracted. The relevant information may be extracted by the relevant information identification module 130, the LLM interface module 132, or by the LLM service 170. In some aspects, causing relevant information to be extracted includes causing the unstructured text to be split into a plurality of text chunks and/or causing the structured data to be split into a plurality of data chunks. In some aspects, for each text chunk in the plurality of text chunks, an augmented text chunk that includes the text chunk, the user query, and an extraction prompt may be sent to the LLM to cause the LLM to extract relevant information from the text chunk. In some aspects, for each data chunk in the plurality of data chunks, an augmented data chunk that includes the text chunk, the user query, and an extraction prompt may be sent to the LLM to cause the LLM to extract relevant information from the data chunk.

The computer-implemented method 800 may include at block 822 sending one or more augmented user queries to an LLM. The augmented user queries may include the relevant information, the user query, and a prompt to cause the LLM to generate a response. The augmented user queries may be sent by the LLM interface module 132. The augmented user queries may be sent to the LLM service 170.

The computer-implemented method 800 may include at block 824 outputting the response. The response may be output by the input/output module 120. The response may be output to the user or to a generative AI pipeline.

It should be understood that not all blocks of the computer-implemented method 800 are required to be performed. Moreover, the computer-implemented method 800 is not mutually exclusive (i.e., block(s) from computer-implemented method 800 may be performed in any particular implementation).

ADDITIONAL CONSIDERATIONS

Although the preceding text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method for providing a decentralized knowledge engine for use with a plurality of external third-party data sources to respond to a user query, the computer-implemented method comprising:
receiving, by one or more processors, the user query from a user device;
generating, by the one or more processors, a user query embedding of the user query;
determining, by the one or more processors, an intent associated with the user query by comparing the user query embedding to a plurality of intent embeddings;
selecting, by the one or more processors, one or more relevant external third-party data sources from the plurality of external third-party data sources by comparing (i) an intent embedding representing the intent as a multi-dimensional vector to (ii) a plurality of external third-party data source metadata embeddings representing respective external third-party data source metadata of each of the plurality of external third-party data sources, wherein the one or more relevant external third-party data sources are (i) distinct from the user device and (ii) selected based upon semantic similarity of their respective external third-party data source metadata embeddings to the intent embedding;
retrieving, by the one or more processors, unstructured text from at least one of the one or more relevant external third-party data sources, wherein the unstructured text is distinct from the user query;
retrieving, by the one or more processors, structured data from at least one of the one or more relevant external third-party data sources;
causing, by the one or more processors, the unstructured text to be split into a plurality of text chunks;
causing, by the one or more processors, the structured data to be split into a plurality of data chunks;
for each text chunk in the plurality of text chunks, sending, by the one or more processors, an augmented text chunk comprising (i) the text chunk, (ii) the user query, and (iii) an extraction prompt to a large language model (LLM) to cause the LLM to extract relevant information from the text chunk;
for each data chunk in the plurality of data chunks, sending, by the one or more processors, an augmented data chunk comprising (i) the data chunk, (ii) the user query, and (iii) an extraction prompt to the LLM to cause the LLM to extract relevant information from the data chunk;
sending, by the one or more processors, one or more augmented user queries to the LLM to cause the LLM to generate a response, the one or more augmented user queries collectively comprising (i) the relevant information, (ii) the user query, and (iii) a prompt; and
outputting, by the one or more processors, the response.

2. The computer-implemented method of claim 1, wherein determining the intent associated with the user query comprises determining the intent from a plurality of predetermined intents based upon the user query and a context based upon a session history associated with the user device.

3. The computer-implemented method of claim 1, wherein the intent comprises one or more keywords, and further comprising searching for the one or more keywords in the external third-party data source metadata.

4. The computer-implemented method of claim 1, wherein retrieving the structured data comprises querying one or more relational databases.

5. A computer system for providing a decentralized knowledge engine for use with a plurality of external third-party data sources to respond to a user query comprising:
a memory storing a set of computer-readable instructions; and
one or more processors interfaced with the memory and configured to execute the set of computer-readable instructions to cause the one or more processors to:
receive the user query from a user device,
generate a user query embedding of the user query,
determine an intent associated with the user query by comparing the user query embedding to a plurality of intent embeddings, select one or more relevant external third-party data sources from the plurality of external third-party data sources by comparing (i) an intent embedding representing the intent as a multi-dimensional vector to (ii) a plurality of external third-party data source metadata embeddings representing respective external third-party data source metadata of each of the plurality of external third-party data sources, wherein the one or more relevant external third-party data sources are (i) distinct from the user device and (ii) selected based upon semantic similarity of their respective external third-party data source metadata embeddings to the intent embedding, retrieve unstructured text from at least one of the one or more relevant external third-party data sources, wherein the unstructured text is distinct from the user query, retrieve structured data from at least one of the one or more relevant external third-party data sources, cause the unstructured text to be split into a plurality of text chunks, cause the structured data to be split into a plurality of data chunks, for each text chunk in the plurality of text chunks, send an augmented text chunk comprising (i) the text chunk, (ii) the user query, and (iii) an extraction prompt to a large language model (LLM) to cause the LLM to extract relevant information from the text chunk, for each data chunk in the plurality of data chunks, send an augmented data chunk comprising (i) the data chunk, (ii) the user query, and (iii) an extraction prompt to the LLM to cause the LLM to extract relevant information from the data chunk, send one or more augmented user queries to the LLM to cause the LLM to generate a response, the one or more augmented user queries collectively comprising (i) the relevant information, (ii) the user query, and (iii) a prompt, and output the response.

6. The computer system of claim 5, wherein determining the intent associated with the user query comprises determining the intent from a plurality of predetermined intents based upon the user query and a context based upon a session history associated with the user device.

7. The computer system of claim 5, wherein the intent comprises one or more keywords, and further comprising searching for the one or more keywords in the external third-party data source metadata.

8. The computer system of claim 5, wherein retrieving the structured data comprises querying one or more relational databases.

9. A non-transitory computer-readable storage medium configured to store instructions executable by one or more processors, the instructions causing the one or more processors to:

receive a user query from a user device;

generate a user query embedding of the user query;

determine an intent associated with the user query by comparing the user query embedding to a plurality of intent embeddings;

select one or more relevant external third-party data sources from the plurality of external third-party data sources by comparing (i) an intent embedding representing the intent as a multi-dimensional vector to (ii) a plurality of external third-party data source metadata embeddings representing respective external third-party data source metadata of each of the plurality of external third-party data sources, wherein the one or more relevant external third-party data sources are (i) distinct from the user device and (ii) selected based upon semantic similarity of their respective external third-party data source metadata embeddings to the intent embedding;

retrieve unstructured text from at least one of the one or more relevant external third-party data sources, wherein the unstructured text is distinct from the user query;

retrieve structured data from at least one of the one or more relevant external third-party data sources;

cause the unstructured text to be split into a plurality of text chunks;

cause the structured data to be split into a plurality of data chunks;

for each text chunk in the plurality of text chunks, send an augmented text chunk comprising (i) the text chunk, (ii) the user query, and (iii) an extraction prompt to a large language model (LLM) to cause the LLM to extract relevant information from the text chunk;

for each data chunk in the plurality of data chunks, send an augmented data chunk comprising (i) the data chunk, (ii) the user query, and (iii) an extraction prompt to the LLM to cause the LLM to extract relevant information from the data chunk;

send one or more augmented user queries to the LLM to cause the LLM to generate a response, the one or more augmented user queries collectively comprising (i) the relevant information, (ii) the user query, and (iii) a prompt; and output the response.

10. The non-transitory computer-readable storage medium of claim 9, wherein determining the intent associated with the user query to be determined comprises determining the intent from a plurality of predetermined intents based upon the user query and a context based upon a session history associated with the user device.

11. The non-transitory computer-readable storage medium of claim 9, wherein the intent comprises one or more keywords, and further comprising searching for the one or more keywords in the external third-party data source metadata.

* * * * *